(12) United States Patent
Damnjanovic et al.

(10) Patent No.: US 12,081,308 B2
(45) Date of Patent: Sep. 3, 2024

(54) MOBILITY SIGNALING FOR RELAY ACTIVATION

(71) Applicant: QUALCOMM Incorporated, San Diego, CA (US)

(72) Inventors: Jelena Damnjanovic, Del Mar, CA (US); Tao Luo, San Diego, CA (US); Junyi Li, Fairless Hills, PA (US); Juan Montojo, San Diego, CA (US); Aleksandar Damnjanovic, Del Mar, CA (US); Sony Akkarakaran, Poway, CA (US); Ozcan Ozturk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 228 days.

(21) Appl. No.: 17/475,261

(22) Filed: Sep. 14, 2021

(65) Prior Publication Data

US 2022/0103243 A1 Mar. 31, 2022

Related U.S. Application Data

(60) Provisional application No. 63/083,845, filed on Sep. 25, 2020.

(51) Int. Cl.
*H04B 7/155* (2006.01)
*H04W 8/08* (2009.01)
(Continued)

(52) U.S. Cl.
CPC .......... *H04B 7/15507* (2013.01); *H04W 8/08* (2013.01); *H04W 72/542* (2023.01); *H04W 76/14* (2018.02); *H04W 4/025* (2013.01)

(58) Field of Classification Search
None
See application file for complete search history.

(56) References Cited

U.S. PATENT DOCUMENTS

2013/0183971 A1* 7/2013 Tamaki ............... H04W 36/165
455/436
2016/0095022 A1* 3/2016 Jin ........................ H04W 76/23
455/438
(Continued)

FOREIGN PATENT DOCUMENTS

EP 3611974 A1 2/2020

OTHER PUBLICATIONS

Ericsson: "Discussions on NR V2X in DC Scenarios", 3GPP TSG-RAN WG2 #105, 3GPP Draft, R2-1901661—Discussions on NR V2X in DC Scenarios, 3rd Generation Partnership Project (3GPP), Mobile Competence Centre, 650, Route Des Lucioles, F-06921 Sophia-Antipolis Cedex, France, vol., RAN WG2, No. Athens, Greece, Feb. 25, 2019-Mar. 1, 2019, Feb. 14, 2019 (Feb. 14, 2019), 3 Pages, XP051603014, Retrieved from the Internet: URL: https://www.3gpp.org/ftp/TSG_RAN/WG2_RL2/TSGR2_105/Docs/R2-1901661.zip, [retrieved on Feb. 14, 2019], The whole document.
(Continued)

*Primary Examiner* — Saumit Shah
(74) *Attorney, Agent, or Firm* — Holland & Hart LLP

(57) ABSTRACT

This disclosure provides systems, methods, and apparatus, including computer programs encoded on computer storage media, for enabling user equipment (UE) mobility within an area. In one aspect, a base station (BS) may configure a set of cells for serving a UE, as well as a set of relay UEs to relay communications for the UE, for example via sidelink communications. The BS may transmit control signaling to the UE indicating the configured set of cells and the set of relay UEs. The UE may establish communications links via sidelink connections with one or more of the relay UEs, and determine an activated subset of cells for data and control transfer. In some implementations, the UE may be configured to autonomously activate or deactivate relay UEs based (Continued)

on the mobility of the UE, and report the activation or deactivation to the BS.

28 Claims, 11 Drawing Sheets

(51) Int. Cl.
*H04W 72/542* (2023.01)
*H04W 76/14* (2018.01)
*H04W 4/02* (2018.01)

(56) References Cited

U.S. PATENT DOCUMENTS

| | | |
|---|---|---|
| 2018/0035398 A1 | 2/2018 | Lee et al. |
| 2020/0092928 A1* | 3/2020 | Shi .................. H04W 76/15 |
| 2021/0377842 A1* | 12/2021 | Xu .................. H04W 40/12 |
| 2022/0078755 A1* | 3/2022 | Xu .................. H04W 72/02 |
| 2022/0201716 A1* | 6/2022 | Yi .................. H04W 72/0453 |

OTHER PUBLICATIONS

International Search Report and Written Opinion—PCT/US2021/050496—ISA/EPO—Jan. 3, 2022.
Vivo: "Scope and Scenarios of SL Relay", 3GPP Draft, R2-2007039, 3rd Generation Partnership Project (3GPP), Mobile Competence Centre, 650, Route Des Lucioles, F-06921 Sophia-Antipolis Cedex, France, vol., RAN WG2, No. E-Meeting, Aug. 17, 2020-Aug. 28, 2020, Aug. 7, 2020 (Aug. 7, 2020), 6 Pages, XP051911887, Retrieved from the Internet: URL: https://www.3gpp.org/ftp/tsg_ran/WG2_RL2/TSGR2_111-e/Docs/R2-2007039.zip, R2-2007039_Scope and Scenarios of SL relay.docx [retrieved on Aug. 7, 2020], The whole document.

* cited by examiner

MOBILITY SIGNALING FOR RELAY ACTIVATION

CROSS REFERENCE

The present application for patent claims the benefit of U.S. Provisional Patent Application No. 63/083,845 by DAMNJANOVIC et al., entitled "MOBILITY SIGNALING FOR RELAY ACTIVATION," filed Sep. 25, 2020, assigned to the assignee hereof, and expressly incorporated by reference herein.

TECHNICAL FIELD

The following relates to wireless communications, including mobility signaling for relay activation.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (such as time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations (BSs) or one or more network access nodes, each simultaneously supporting communication for multiple communication devices, which may be otherwise known as user equipment (UE).

SUMMARY

The systems, methods and devices of this disclosure each have several innovative aspects, no single one of which is solely responsible for the desirable attributes disclosed herein.

One innovative aspect of the subject matter described in this disclosure can be implemented in an apparatus for wireless communication at an apparatus of a user equipment (UE) is described. The apparatus can include a first interface, a second interface, and a processing system. In some implementations, the first interface can be configured to obtain, from a base station (BS), control signaling indicating a relay UE and a set of cells associated with the BS, the relay UE configured for relaying communications with the BS. In some implementations, the processing system can be configured to establish a communications link with the relay UE based on receiving the control signaling, and determine an activated subset of cells in the set of cells based on receiving the control signaling and establishing the communications link. In some implementations, the first interface or the second interface can be configured to communicate with the BS via the relay UE and the activated subset of cells based on determining the activated subset of cells.

Another innovative aspect of the subject matter described in this disclosure can be implemented in a method of wireless communication at an apparatus of a UE is described. In some implementations, the method can include receiving, from a BS, control signaling indicating a relay UE and a set of cells associated with the BS, the relay UE configured for relaying communications with the BS, establishing a communications link with the relay UE based on receiving the control signaling, determining an activated subset of cells in the set of cells based on receiving the control signaling and establishing the communications link, and communicating with the BS via the relay UE and the activated subset of cells based on determining the activated subset of cells.

Another innovative aspect of the subject matter described in this disclosure can be implemented in another apparatus for wireless communication at an apparatus of a UE is described. In some implementations, the apparatus can include means for receiving, from a BS, control signaling indicating a relay UE and a set of cells associated with the BS, the relay UE configured for relaying communications with the BS, establishing a communications link with the relay UE based on receiving the control signaling, determining an activated subset of cells in the set of cells based on receiving the control signaling and establishing the communications link, and communicating with the BS via the relay UE and the activated subset of cells based on determining the activated subset of cells.

Another innovative aspect of the subject matter described in this disclosure can be implemented in a non-transitory computer-readable medium storing code for wireless communication at an apparatus of a UE is described. In some implementations, the code can include instructions executable by a processor to receive, from a BS, control signaling indicating a relay UE and a set of cells associated with the BS, the relay UE configured for relaying communications with the BS, establish a communications link with the relay UE based on receiving the control signaling, determine an activated subset of cells in the set of cells based on receiving the control signaling and establishing the communications link, and communicate with the BS via the relay UE and the activated subset of cells based on determining the activated subset of cells.

In some implementations, the method, apparatuses, and non-transitory computer-readable medium can include operations, features, means, or instructions for determining a set of relay UEs including the relay UE based on receiving the control signaling, establishing communications links with one or more relay UEs of the set of relay UEs based on determining the set of relay UEs, determining an activated subset of relay UEs in the set of relay UEs based on establishing the communications links, the activated subset of relay UEs including the relay UE, and communicating with the BS via the activated subset of relay UEs based on determining the activated subset of relay UEs.

In some implementations, the method, apparatuses, and non-transitory computer-readable medium can include operations, features, means, or instructions for transmitting activation signaling to the one or more relay UEs, where the activation signaling indicates an activation for relaying communications with the BS, and transmitting signaling to the BS indicating the activation.

In some implementations, the method, apparatuses, and non-transitory computer-readable medium can include operations, features, means, or instructions for transmitting, to the BS, signaling indicating a set of candidate relay UEs configured for relaying communications with the BS, where the control signaling may be received based on the transmitted signaling.

In some implementations of the method, apparatuses, and non-transitory computer-readable medium described herein, the set of relay UEs include one or more candidate relay UEs of the set of candidate relay UEs.

In some implementations, the method, apparatuses, and non-transitory computer-readable medium can include operations, features, means, or instructions for determining a respective sidelink channel quality associated with each candidate relay UE of the set of candidate relay UEs, where the transmitted signaling may be based on determining the respective sidelink channel quality.

In some implementations, the method, apparatuses, and non-transitory computer-readable medium can include operations, features, means, or instructions for transmitting, to the BS, a report indicating the respective sidelink channel quality associated with each candidate relay UE of the set of candidate relay UEs, where receiving the control signaling may be further based on transmitting the report.

In some implementations, the method, apparatuses, and non-transitory computer-readable medium can include operations, features, means, or instructions for performing a discovery procedure to identify the set of candidate relay UEs, where the transmitted signaling may be based on performing the discovery procedure.

In some implementations, the method, apparatuses, and non-transitory computer-readable medium can include operations, features, means, or instructions for determining that the BS includes serving cells for the set of candidate relay UEs, where the transmitted signaling may be based on determining that the BS includes the serving cells for the set of candidate relay UEs.

In some implementations, the method, apparatuses, and non-transitory computer-readable medium can include operations, features, means, or instructions for determining that the BS includes a serving cell for the relay UE, where establishing the communications link with the relay UE may be further based on determining that the BS includes the serving cell of the relay UE.

In some implementations, the method, apparatuses, and non-transitory computer-readable medium can include operations, features, means, or instructions for receiving second control signaling indicating mobility information for the set of cells, the relay UE, or both, and updating the activated subset of cells in the set of cells based on receiving the second control signaling, where communicating with the BS may be further based on updating the activated subset.

In some implementations, the method, apparatuses, and non-transitory computer-readable medium can include operations, features, means, or instructions for determining a second activated subset of cells associated with communications between the BS and the relay UE based on establishing the communications link, where determining the activated subset of cells may be based on determining the second activated subset of cells.

In some implementations, the method, apparatuses, and non-transitory computer-readable medium can include operations, features, means, or instructions for determining a second set of cells associated with communications between the BS and the relay UE, where the second set of cells include the second activated subset of cells.

In some implementations of the method, apparatuses, and non-transitory computer-readable medium described herein, the activated subset of cells includes the second activated subset of cells.

In some implementations, the method, apparatuses, and non-transitory computer-readable medium can include operations, features, means, or instructions for determining that the relay UE supports mobility signaling, where establishing the communications link with the relay UE may be further based on determining that the relay UE supports mobility signaling.

In some implementations of the method, apparatuses, and non-transitory computer-readable medium described herein, the communications link with the relay UE includes a sidelink connection.

In some implementations of the method, apparatuses, and non-transitory computer-readable medium described herein, the set of cells may be supported by one or more distributed units (DUs) under a common central unit (CU) of the BS.

In some implementations of the method, apparatuses, and non-transitory computer-readable medium described herein, the one or more DUs include a common DU that supports each cell of the set of cells.

Another innovative aspect of the subject matter described in this disclosure can be implemented in an apparatus for wireless communication at an apparatus of a BS is described. The apparatus can include a first interface, a second interface, and a processing system. In some implementations, the processing system can be configured to configure a relay UE for relaying communications with a UE, and determine an activated subset of cells in a set of cells associated with the BS based on configuring the relay UE. In some implementations, the first interface can be configured to output, for transmission to the UE, control signaling indicating the relay UE and the set of cells. In some implementations, the first interface or the second interface can be configured to communicate with the UE via the relay UE and the activated subset of cells based on transmitting the control signaling.

Another innovative aspect of the subject matter described in this disclosure can be implemented in a method of wireless communication at an apparatus of a BS is described. In some implementations, the method can include configuring a relay UE for relaying communications with a UE, determining an activated subset of cells in a set of cells associated with the BS based on configuring the relay UE, transmitting, to the UE, control signaling indicating the relay UE and the set of cells, and communicating with the UE via the relay UE and the activated subset of cells based on transmitting the control signaling.

Another innovative aspect of the subject matter described in this disclosure can be implemented in an apparatus for wireless communication at an apparatus of a BS is described. In some implementations, the apparatus can include means for configuring a relay UE for relaying communications with a UE, determining an activated subset of cells in a set of cells associated with the BS based on configuring the relay UE, transmitting, to the UE, control signaling indicating the relay UE and the set of cells, and communicating with the UE via the relay UE and the activated subset of cells based on transmitting the control signaling.

Another innovative aspect of the subject matter described in this disclosure can be implemented in a non-transitory computer-readable medium storing code for wireless communication at an apparatus of a BS is described. In some implementations, the code can include instructions executable by a processor to configure a relay UE for relaying communications with a UE, determine an activated subset of cells in a set of cells associated with the BS based on configuring the relay UE, transmit, to the UE, control signaling indicating the relay UE and the set of cells, and communicate with the UE via the relay UE and the activated subset of cells based on transmitting the control signaling.

In some implementations, the method, apparatuses, and non-transitory computer-readable medium can include operations, features, means, or instructions for configuring a set of relay UEs including the relay UE, where the control signaling indicates the set of relay UEs, determining an activated subset of relay UEs in the set of relay UEs based on configuring the set of relay UEs, the activated subset of relay UEs including the relay UE, and communicating with the UE via the activated subset of relay UEs based on determining the activated subset of relay UEs.

In some implementations, the method, apparatuses, and non-transitory computer-readable medium can include operations, features, means, or instructions for receiving, from the UE, signaling indicating an activation of one or more relay UEs for relaying communications with the BS, and updating the activated subset of relay UEs in the set of relay UEs based on receiving the signaling, where communicating with the UE may be further based on updating the activated subset of relay UEs.

In some implementations, the method, apparatuses, and non-transitory computer-readable medium can include operations, features, means, or instructions for receiving, from the one or more relay UEs, second signaling indicating the activation, where updating the activated subset of relay UEs in the set of relay UEs may be further based on receiving the second signaling.

In some implementations, the method, apparatuses, and non-transitory computer-readable medium can include operations, features, means, or instructions for receiving, from the UE, signaling indicating one or more candidate relay UEs configured for relaying communications with the UE, where configuring the set of relay UEs may be based on the received signaling.

In some implementations of the method, apparatuses, and non-transitory computer-readable medium described herein, the set of relay UEs include one or more candidate relay UEs of the set of candidate relay UEs.

In some implementations, the method, apparatuses, and non-transitory computer-readable medium can include operations, features, means, or instructions for receiving, from the UE, a report indicating a respective sidelink channel quality associated with each candidate relay UE of the one or more candidate relay UEs, where configuring the set of relay UEs may be further based on receiving the report.

In some implementations, the method, apparatuses, and non-transitory computer-readable medium can include operations, features, means, or instructions for determining that the BS includes a serving cell of the relay UE, where configuring the relay UE for relaying communications with the UE may be further based on determining that the BS includes the serving cell of the relay UE.

In some implementations, the method, apparatuses, and non-transitory computer-readable medium can include operations, features, means, or instructions for transmitting second control signaling indicating mobility information for the set of cells, the relay UE, or both, and updating the activated subset of cells in the set of cells based on transmitting the second control signaling, where communicating with the UE may be further based on updating the activated subset.

In some implementations, the method, apparatuses, and non-transitory computer-readable medium can include operations, features, means, or instructions for determining a second activated subset of cells associated with communications between the BS and the relay UE based on configuring the relay UE, where determining the activated subset of cells may be based on determining the second activated subset of cells.

In some implementations, the method, apparatuses, and non-transitory computer-readable medium can include operations, features, means, or instructions for determining a second set of cells associated with communications between the BS and the relay UE, where the second set of cells include the second activated subset of cells.

In some implementations of the method, apparatuses, and non-transitory computer-readable medium described herein, the activated subset of cells includes the second activated subset of cells.

In some implementations, the method, apparatuses, and non-transitory computer-readable medium can include operations, features, means, or instructions for determining that the relay UE supports mobility signaling, where configuring the relay UE may be based on determining that the relay UE supports mobility signaling.

In some implementations of the method, apparatuses, and non-transitory computer-readable medium described herein, the set of cells may be supported by one or more DUs under a common CU of the BS.

In some implementations of the method, apparatuses, and non-transitory computer-readable medium described herein, the one or more DUs include a common DU that supports each cell of the set of cells.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
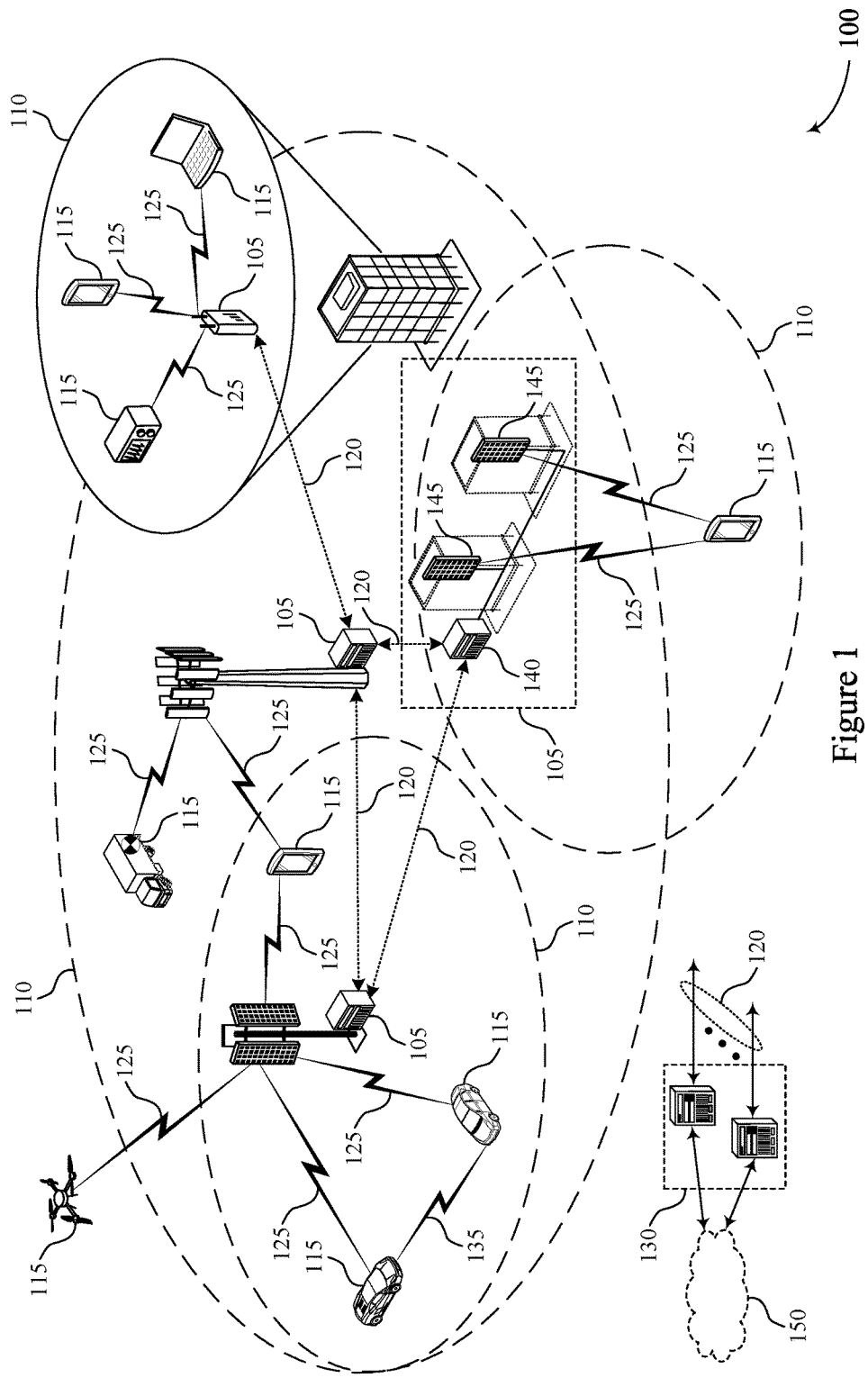
FIG. 1 shows an example wireless communications system that supports mobility signaling for relay activation.

The following description is directed to implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving radio frequency (RF) signals according to any of the Institute of Electrical and Electronics Engineers (IEEE) 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

Some wireless communication systems may include user equipment (UE) communicating with network nodes such as base stations (BSs). Each BS may provide communication coverage for UEs via one or more cells. A BS may configure a set of cells for serving a UE to enable mobility within an area. A subset of the configured set may be activated to serve the UE for data and control transfer. As the UE moves within the area, cells within the configured set may be activated or deactivated, for example via Layer 1 (L1) signaling, such as physical (PHY) layer signaling, or Layer 2 (L2) signaling, such as medium access control (MAC) layer signaling.

In some implementations, the BS may configure a set of UEs (which may be referred to as a set of relay UEs) to relay communications for the UE, for example via sidelink communications. A sidelink communication may be an example of device-to-device (D2D) communication, vehicle-to-everything (V2X) communication, or another such example of sidelink communication in a wireless communications system. From the perspective of the BS, the configured set of cells for the UE may include a first subset of cells the UE is configured to use for direct communication and a second subset of cells that may connect to the UE via the set of relay UEs. In some implementations, the first subset of cells and the second subset of cells may overlap, where one or more cells may be included in each of the first and second subsets of cells. The BS may configure one or more cells of the configured set of cells as an activated subset of cells for the UE. The activated subset of cells may include a first subset of activated cells directly connected to the UE and a second subset of activated cells connected to an activated subset of the set of relay UEs.

The BS may transmit control signaling to the UE indicating the configured set of cells and the set of relay UEs. The UE may establish communications links via sidelink connections with one or more of the relay UEs. The UE also may determine the activated subset of cells configured by the BS. In some implementations, the UE may be configured to autonomously activate or deactivate relay UEs based on the mobility of the UE, and report the activation or deactivation to the BS. In some implementations, the UE may be aware of the activated cells connected to the activated subset of relay UEs. In some implementations, the UE may transmit signaling identifying candidate relay UEs to the BS, for example based on sidelink channel quality or positions of the candidate relay UEs, or a discovery procedure. Based on the signaling, the BS may configure the set of relay UEs for the UE, where the set may include the candidate relay UEs identified by the UE.

Particular implementations of the subject matter described in this disclosure can be implemented to realize one or more of the following potential advantages. For example, by configuring relay UEs to support UE mobility, a BS may effectively increase the quantity of cells in the activated subset for the UE, which may improve communications reliability for the UE while moving within an area. In some implementations, by configuring the UE to autonomously activate or deactivate relay UEs, the UE may efficiently reconfigure the activated subset of relay UEs and the activated subset of cells to improve mobility. Accordingly, the BS and the UE may facilitate greater communications efficiency and higher throughput based on the low overhead associated with mobility using L1 or L2 signaling. The BS and the UE also may experience lower latency based on increasing a coverage area of the UE due to the communications links with the relay UEs.

FIG. 1 shows an example of a wireless communications system 100 that supports mobility signaling for relay activation. The wireless communications system 100 may include one or more BSs 105, one or more UEs 115, and a core network 130. In some implementations, the wireless communications system 100 may be a Long Term Evolution (LTE) network, an LTE-Advanced (LTE-A) network, an LTE-A Pro network, or a New Radio (NR) network. In some implementations, the wireless communications system 100 may support enhanced broadband communications, ultra-reliable (such as mission critical) communications, low latency communications, communications with low-cost and low-complexity devices, or any combination thereof.

The BSs 105 may be dispersed throughout a geographic area to form the wireless communications system 100 and may be devices in different forms or having different capabilities. The BSs 105 and the UEs 115 may wirelessly communicate via one or more communications links 125. Each BS 105 may provide a coverage area 110 over which the UEs 115 and the BS 105 may establish one or more communications links 125. The coverage area 110 may be an example of a geographic area over which a BS 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some examples of UEs 115 are illustrated in FIG. 1. The UEs 115 described herein may be able to communicate with various types of devices, such as other UEs 115, the BSs 105, or network equipment (such as core network nodes, relay devices, integrated access and backhaul (IAB) nodes, or other network equipment), as shown in FIG. 1.

The BSs 105 may communicate with the core network 130, or with one another, or both. For example, the BSs 105 may interface with the core network 130 through one or more backhaul links 120 (such as via an S1, N2, N3, or another interface). The BSs 105 may communicate with one another over the backhaul links 120 (such as via an X2, Xn, or other interface) either directly (such as directly between BSs 105), or indirectly (such as via core network 130), or both. In some implementations, the backhaul links 120 may be or include one or more wireless links.

One or more of the BSs 105 described herein may include or may be referred to by a person having ordinary skill in the art as a base transceiver station, a radio BS, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" also may be referred to as a unit, a station, a terminal, or a client, among other examples. A UE 115 also may include or may be referred to as a personal electronic device such as a cellular phone, a personal digital assistant (PDA), a tablet computer, a laptop computer, or a personal computer. In some implementations, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the BSs 105 and the network equipment including macro eNBs or gNBs, small cell eNBs or gNBs, or relay BSs, among other examples, as shown in FIG. 1.

The UEs 115 and the BSs 105 may wirelessly communicate with one another via one or more communications links 125 over one or more carriers. The term "carrier" may refer to a set of radio frequency spectrum resources having a defined PHY layer structure for supporting the communications links 125. For example, a carrier used for a communications link 125 may include a portion of a radio frequency spectrum band (such as a bandwidth part (BWP)) that is operated according to one or more PHY layer channels for a given radio access technology (such as LTE, LTE-A, LTE-A Pro, NR). Each PHY layer channel may carry acquisition signaling (such as synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (such as using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (such as a duration of one modulation symbol) and one subcarrier, where the symbol period and subcarrier spacing are inversely related. The number of bits carried by each resource element may depend on the modulation scheme (such as the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (such as spatial layers or beams), and the use of multiple spatial layers may further increase the data rate or data integrity for communications with a UE 115.

The time intervals for the BSs 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (such as 10 milliseconds (ms)). Each radio frame may be identified by a system frame number (SFN) (such as ranging from 0 to 1023).

Each frame may include multiple consecutively numbered subframes or slots, and each subframe or slot may have the same duration. In some implementations, a frame may be divided (such as in the time domain) into subframes, and each subframe may be further divided into a number of slots. Alternatively, each frame may include a variable number of slots, and the number of slots may depend on subcarrier spacing. Each slot may include a number of symbol periods (such as depending on the length of the cyclic prefix prepended to each symbol period). In some wireless communications systems 100, a slot may further be divided into multiple mini-slots containing one or more symbols. Excluding the cyclic prefix, each symbol period may contain one or more (such as $N_f$) sampling periods. The duration of a symbol period may depend on the subcarrier spacing or frequency band of operation.

A subframe, a slot, a mini-slot, or a symbol may be the smallest scheduling unit (such as in the time domain) of the wireless communications system 100 and may be referred to as a transmission time interval (TTI). In some implementations, the TTI duration (such as the number of symbol periods in a TTI) may be variable. Additionally, or alternatively, the smallest scheduling unit of the wireless communications system 100 may be dynamically selected (such as in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (such as a control resource set (CORESET)) for a physical control channel may be defined by a number of symbol periods and may extend across the system bandwidth or a subset of the system bandwidth of the carrier. One or more control regions (such as CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (such as control channel elements (CCEs)) associated with encoded information for a control information format having a given payload size. Search space sets may include common search space sets configured for sending control information to multiple UEs 115 and UE-specific search space sets for sending control information to a specific UE 115.

Each BS 105 may provide communication coverage via one or more cells, for example a macro cell, a small cell, a hot spot, or other types of cells, or any combination thereof. The term "cell" may refer to a logical communication entity used for communication with a BS 105 (such as over a carrier) and may be associated with an identifier for distinguishing neighboring cells (such as a physical cell identifier (PCID), a virtual cell identifier (VCID), or others). In some implementations, a cell also may refer to a geographic coverage area 110 or a portion of a geographic coverage area 110 (such as a sector) over which the logical communication entity operates. Such cells may range from smaller areas (such as a structure, a subset of structure) to larger areas depending on various factors such as the capabilities of the BS 105. For example, a cell may be or include a building, a subset of a building, or exterior spaces between or overlapping with geographic coverage areas 110, among other examples.

A macro cell generally covers a relatively large geographic area (such as several kilometers in radius) and may allow unrestricted access by the UEs 115 with service subscriptions with the network provider supporting the macro cell. A small cell may be associated with a lower-powered BS 105, as compared with a macro cell, and a small cell may operate in the same or different (such as licensed, unlicensed) frequency bands as macro cells. Small cells may provide unrestricted access to the UEs 115 with service subscriptions with the network provider or may provide restricted access to the UEs 115 having an association with the small cell (such as the UEs 115 in a closed subscriber group (CSG), the UEs 115 associated with users in a home or office). A BS 105 may support one or multiple cells and also may support communications over the one or more cells using one or multiple component carriers.

In some implementations, a carrier may support multiple cells, and different cells may be configured according to different protocol types (such as MTC, narrowband IoT (NB-IoT), enhanced mobile broadband (eMBB)) that may provide access for different types of devices.

In some implementations, a BS 105 may be movable and therefore provide communication coverage for a moving geographic coverage area 110. In some implementations, different geographic coverage areas 110 associated with different technologies may overlap, but the different geographic coverage areas 110 may be supported by the same BS 105. In other implementations, the overlapping geographic coverage areas 110 associated with different technologies may be supported by different BSs 105. The wireless communications system 100 may include, for example, a heterogeneous network in which different types of the BSs 105 provide coverage for various geographic coverage areas 110 using the same or different radio access technologies.

Some UEs 115 may be configured to employ operating modes that reduce power consumption, such as half-duplex communications (such as a mode that supports one-way communication via transmission or reception, but not transmission and reception simultaneously). In some implementations, half-duplex communications may be performed at a reduced peak rate. Other power conservation techniques for the UEs 115 include entering a power saving deep sleep mode when not engaging in active communications, operating over a limited bandwidth (such as according to narrowband communications), or a combination of these techniques. For example, some UEs 115 may be configured for operation using a narrowband protocol type that is associated with a defined portion or range (such as set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (such as mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some implementations, a UE 115 also may be able to communicate directly with other UEs 115 over a D2D communication link 135 (such as using a peer-to-peer (P2P) or D2D protocol). One or more UEs 115 utilizing D2D communications may be within the geographic coverage area 110 of a BS 105. Other UEs 115 in such a group may be outside the geographic coverage area 110 of a BS 105 or be otherwise unable to receive transmissions from a BS 105. In some implementations, groups of the UEs 115 communicating via D2D communications may utilize a one-to-many (1:M) system in which each UE 115 transmits to every other UE 115 in the group. In some implementations, a BS 105 facilitates the scheduling of resources for D2D communications. In other implementations, D2D communications are carried out between the UEs 115 without the involvement of a BS 105.

In some systems, the D2D communication link 135 may be an example of a communication channel, such as a sidelink communication channel, between vehicles (such as UEs 115). In some implementations, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some implementations, vehicles in a V2X system may communicate with roadside infrastructure, such as roadside units, or with the network via one or more network nodes (such as BSs 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (such as a mobility management entity (MME), an access and mobility management function (AMF)) and at least one user plane entity that routes packets or interconnects to external networks (such as a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the BSs 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a BS 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or BS 105 may be distributed across various network devices (such as radio heads and ANCs) or consolidated into a single network device (such as a BS 105).

The wireless communications system 100 may operate using one or more frequency bands, for example in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (such as less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the BSs 105 and the UEs 115 may employ carrier sensing for collision detection and avoidance. In some implementations, operations in unlicensed bands may be based on a carrier aggregation configuration in conjunction with component carriers operating in a licensed band (such as LAA). Operations in unlicensed spectrum may include downlink transmissions, uplink transmissions, P2P transmissions, or D2D transmissions, among other examples.

A BS 105 or a UE 115 may be equipped with multiple antennas, which may be used to employ techniques such as transmit diversity, receive diversity, multiple-input multiple-output (MIMO) communications, or beamforming. The antennas of a BS 105 or a UE 115 may be located within one or more antenna arrays or antenna panels, which may support MIMO operations or transmit or receive beamforming. For example, one or more BS antennas or antenna arrays may be co-located at an antenna assembly, such as an antenna tower. In some implementations, antennas or antenna arrays associated with a BS 105 may be located in diverse geographic locations. A BS 105 may have an antenna array with a number of rows and columns of antenna ports that the BS 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which also may be referred to as spatial filtering, directional transmission, or directional reception, is a signal processing technique that may be used at a transmitting device or a receiving device (such as a BS 105, a UE 115) to shape or steer an antenna beam (such as a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (such as with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer also may use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a BS 105 or a core network 130 supporting radio bearers for user plane data. At the PHY layer, transport channels may be mapped to physical channels.

The UEs 115 and the BSs 105 may support retransmissions of data to increase the likelihood that data is received successfully. Hybrid automatic repeat request (HARQ) feedback is one technique for increasing the likelihood that data is received correctly over a communications link 125. HARQ may include a combination of error detection (such as using a cyclic redundancy check (CRC)), forward error correction (FEC), and retransmission (such as automatic repeat request (ARQ)). HARQ may improve throughput at the MAC layer in poor radio conditions (such as low signal-to-noise conditions). In some implementations, a device may support same-slot HARQ feedback, where the device may provide HARQ feedback in a specific slot for data received in a previous symbol in the slot. In some other implementations, the device may provide HARQ feedback in a subsequent slot, or according to some other time interval.

In some implementations, a BS 105 may configure a set of cells for serving a UE 115 to enable mobility within an area, as well as a set of relay UEs 115 to relay communications for the UE 115, for example via sidelink communications. The BS 105 may transmit control signaling to the UE 115 indicating the configured set of cells and the set of relay UEs 115. The UE 115 may establish communications links via sidelink connections with one or more of the set of relay UEs 115, and determine an activated subset of cells in the configured set of cells. In some implementations, the UE 115 may be configured to autonomously activate or deactivate relay UEs 115 based on the mobility of the UE 115, and report the activation or deactivation to the BS 105. In some implementations, the UE 115 may transmit signaling identifying candidate relay UEs 115 to the BS 105. Based on the signaling, the BS 105 may configure the set of relay UEs 115 for the UE 115, where the set may include the candidate relay UEs 115 identified by the UE 115.

Figures 2A, 2B:
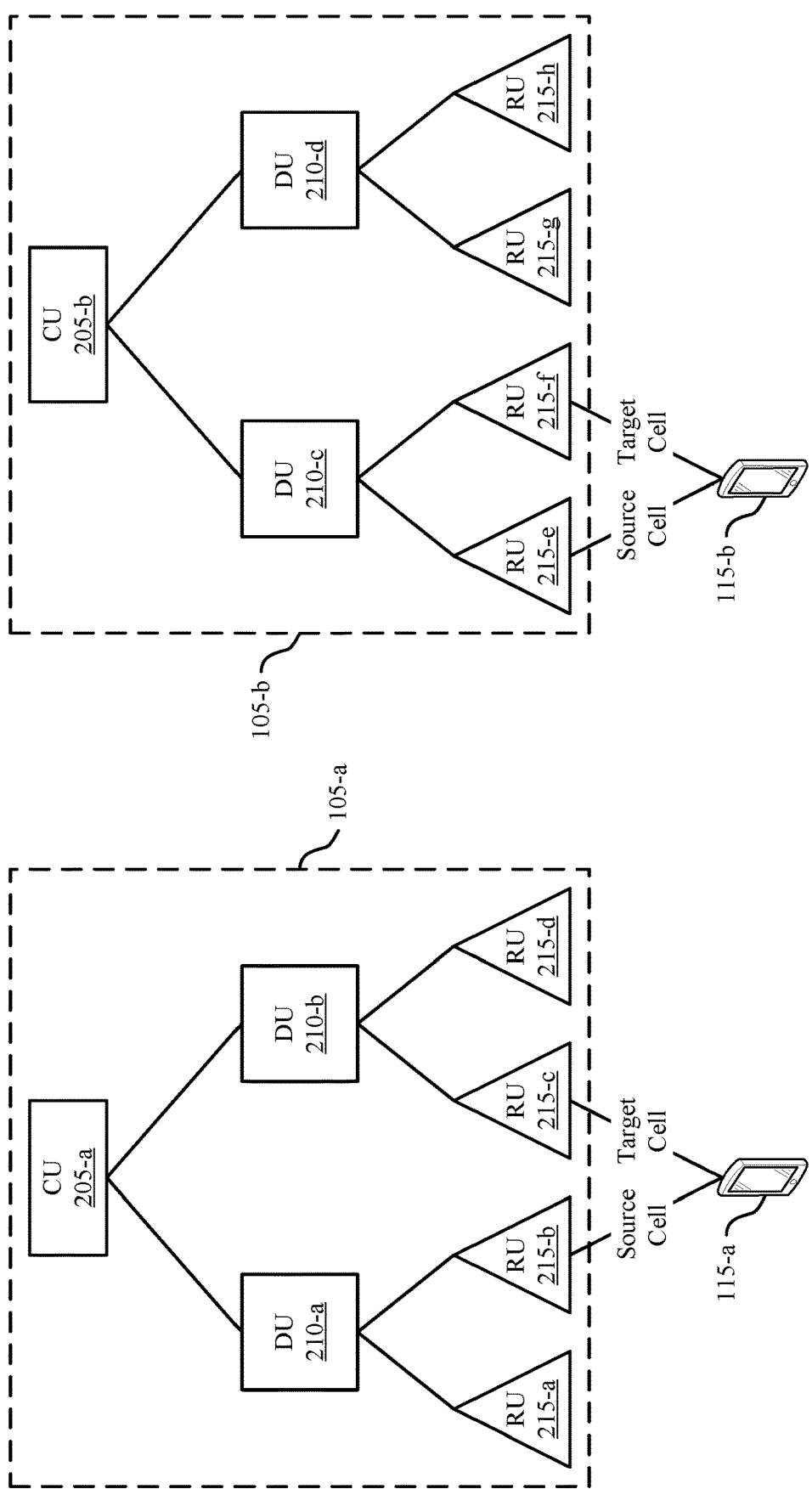
FIGS. 2A and 2B show example architectures that support mobility signaling for relay activation.

FIGS. 2A and 2B show example architectures 200 that support mobility signaling for relay activation. In some implementations, the architectures 200 may implement aspects of the wireless communications system 100, depicted and described in FIG. 1. The architectures 200 may illustrate components of BSs 105 serving UEs 115.

A BS 105 may include a central unit (CU) 205, one or more distributed units (DUs) 210, and one or more radio units (RUs) 215. In some implementations, the CU 205, the DUs 210, and the RUs 215 may be included in distinct network nodes, in distinct components of a network (like nodes in a radio access network (RAN), a virtual RAN (vRAN), or Open Source RAN (ORAN)), or in distinct BSs 105. The CU 205, DUs 210, and RUs 215 may each host one or more protocol layers of a layered protocol stack according to a logical architecture functional split option. In some implementations, the options implemented at the architectures 200 may include double split architecture options. In some options (which may be referred to as option 2), the CU 205 may host RRC and PDCP layers of the BS 105. In one example option (which may be referred to as an option 2&6 for the double split architecture), each DU 210 may host RLC and MAC layers of the BS 105, and each RU 215 may host the PHY layer. In another example option (which may be referred to as an option 2&7 for the double split architecture), each DU 210 may host RLC and MAC layers of the BS 105, as well as higher PHY layer operations, and each RU 215 may host lower PHY layer operations.

Each RU 215 of the BS 105 may support a cell which may serve a UE 115. As the UE 115 moves within a coverage area of the BS 105, the UE 115 may trigger a handover from a source cell to a target cell. In the architecture 200-*a* of a BS 105-*a* shown in FIG. 2A, an RU 215-*b* may support the source cell for a UE 115-*a*, and an RU 215-*c* may support the target cell for the UE 115-*a*. A DU 210-*a* may support the RU 215-*b* and a different DU 210-*b* may support the RU 215-*c*, where the source cell and the target cell may have common PDCP and RRC protocol layers. The source cell and the target cell may have non-collocated PHY, MAC, and RLC layers, and the data and control paths from the PDCP layer to the different RLC layers, among other control aspects, may be addressed in configuring L1 or L2 mobility signaling for the UE 115-*a*. In some implementations, L1 signaling may include downlink control information (DCI) transmitted via the PHY layer, and L2 signaling may include a MAC control element (MAC-CE) transmitted via the MAC layer.

In the architecture 200-*b* of a BS 105-*b* shown in FIG. 2B, an RU 215-*e* may support the source cell for a UE 115-*b*, and an RU 215-*f* may support the target cell for the UE 115-*b*. A same DU 210-*c* may support the RU 215-*e* and the RU 215-*e*, where the source cell and the target cell may share MAC and higher protocol layers. That is, data and control paths for the UE 115-*b* may remain unchanged above the PHY layer during the handover, and L1 or L2 mobility signaling may be feasible for the UE 115-*a*. The BS 105-*b* may trigger a handover procedure for the UE 115-*b* using techniques similar to carrier aggregation (CA) techniques, where the source cell and the target cell may communicate on same carrier frequencies. As such, the BS 105-*b* may use mechanisms similar to those used in CA operation to enable L1 or L2 mobility signaling for the UE 115-*b*.

The BS 105-*b* may use RRC signaling to configure a set of cells (supported by a set of RUs 215) for L1 or L2 mobility. The BS 105-*b* may configure the set of cells to provide coverage for the UE 115-*b*, for example based on an anticipated mobility for the UE 115-*b* within an area. The set of cells may include an activated subset that may serve the UE 115-*b* for data and control transfer, as well as a deactivated subset that may be readily activated by L1 or L2 signaling. That is, the BS 105-*b* may use L1 or L2 signaling to activate or deactivate cells in the set of cells and to select beams within the activated cells for the UE 115-*b*. In some implementations, the BS 105-*b* may use L1 or L2 signaling to set a primary cell (PCell) within the activated subset. In some implementations, the BS 105-*b* may change the PCell to a cell that is not in the activated subset using a Layer 3 (L3) handover procedure. Following an L3 handover, the BS 105-*b* may use RRC signaling to update the set of cells for L1 or L2 mobility.

In some implementations, the BS 105-*b* may configure a set of relay UEs (not shown) to relay communications for the UE 115-*b*, which may effectively increase the quantity of cells configured for L1 or L2 mobility for the UE 115-*b*. The BS 105-*b* may transmit control signaling (such as RRC signaling) to the UE 115-*b* indicating the configured set of cells and the set of relay UEs. In some implementations, the UE 115-*b* may be configured to use L1 or L2 mobility signaling to autonomously activate or deactivate relay UEs based on the mobility of the UE 115-*b*. The UE 115-*b* also may use L1 or L2 mobility signaling to directly inform the BS 105-*b* of activation or deactivation. Additionally, or alternatively, the relay UEs may use L1 or L2 mobility signaling to directly inform the BS 105-*b* of activation or deactivation signaling received from the UE 115-*b*. The activation signaling from the relay UEs may delay the activation procedure, but may improve coverage for the UE 115-*b*.

Figure 3:
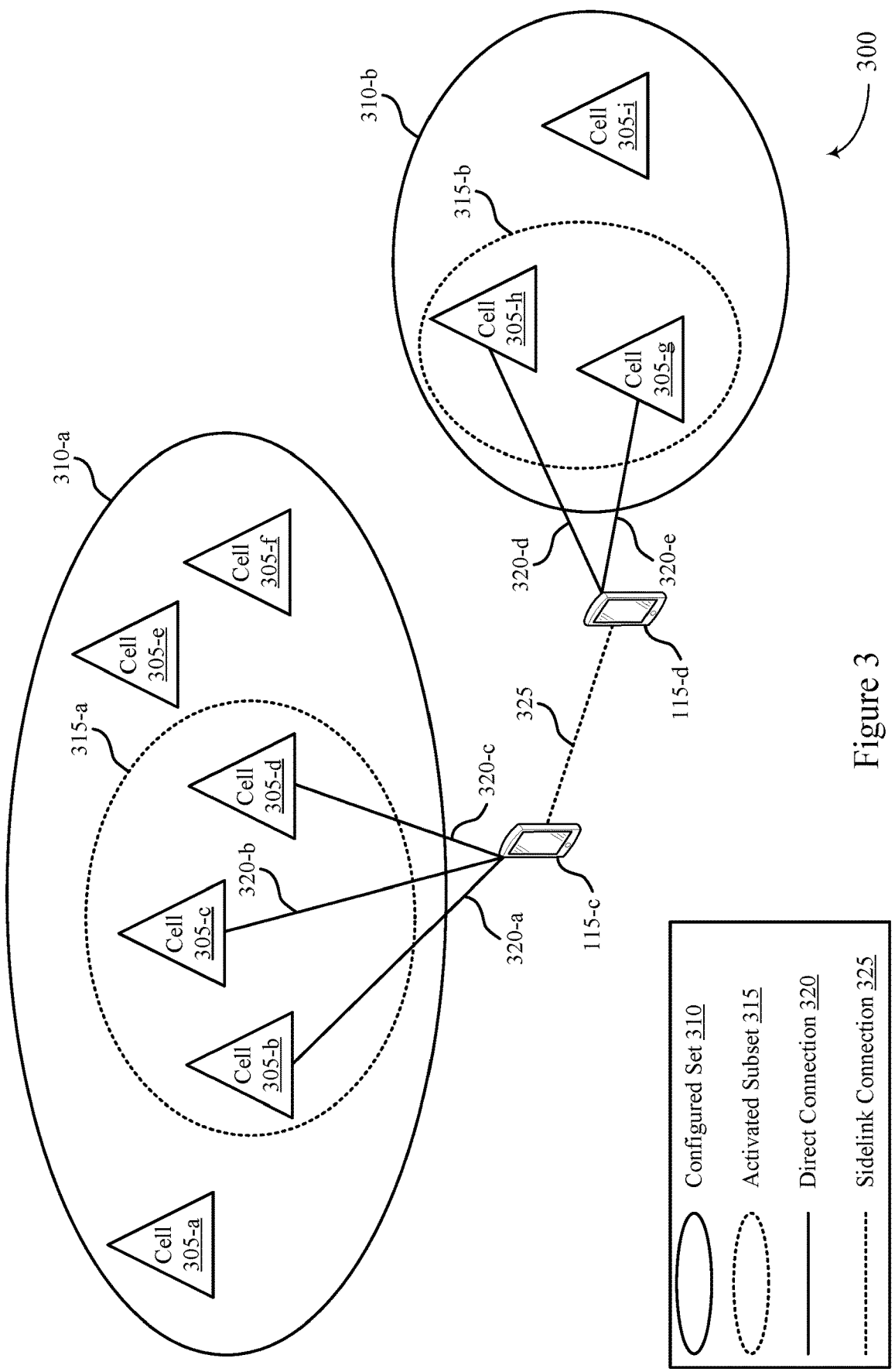
FIGS. 3 and 4 show example wireless communications systems that support mobility signaling for relay activation.

FIG. 3 shows an example wireless communications system 300 that supports mobility signaling for relay activation. In some implementations, the wireless communications system 300 may implement aspects of the wireless communications system 100, depicted and described in FIG. 1. For example, the wireless communications system 300 may include a set of UEs 115 in communication with a set of cells 305 associated with a BS (not shown), such as the BS 105 depicted and described in FIG. 1, or one of the BS 105-*a* and the BS 105-*b* depicted and described in FIG. 2. A UE 115-*c* may be configured with a configured set 310-*a* of cells 305 for L1 or L2 mobility. The UE 115-*c* may be connected via direct connections 320 with cells 305 of an activated subset 315-*a*, where the configured set 310-*a* includes the activated subset 315-*a*. In some implementations, the direct connections 320 may be examples of the communications links 125 described with reference to FIG. 1.

In some implementations, the BS may determine to configure a relay UE 115-*d* to relay communications for the UE 115-*c*, for example via a sidelink connection 325. In some implementations, the BS may configure the relay UE 115-*d* based on determining that the BS serves the relay UE 115-*d*, or that a same DU of the BS serves the UE 115-*c* and the UE 115-*d*. In some implementations, the BS may configure the relay UE 115-*d* based on determining that the relay UE 115-*d* supports L1 or L2 mobility. The relay UE 115-*d* may be configured with a configured set 310-*b* of cells 305 for L1 or L2 mobility. The UE 115-*d* may be connected via direct connections 320 with cells 305 of an activated subset 315-*b*, where the configured set 310-*b* includes the activated subset 315-*b*.

Based on configuring the relay UE 115-*d*, the BS may explicitly or implicitly update the configured set 310 and the activated subset 315 for the UE 115-*c*. That is, from the perspective of the BS, the configured set 310 for the UE 115-*c* may include the cells 305 of the configured set 310-*a* and the cells 305 of the configured set 310-*b*. Similarly, the activated subset 315 for the UE 115-*c* may include the cells 305 of the activated subset 315-*a* and the cells 305 of the activated subset 315-*b*. In some implementations, the configured sets 310-*a* and 310-*b* may overlap, where a cell (not shown) may be included in each of the configured sets 310-*a* and 310-*b*. Similarly, in some implementations, the activated subsets 315-*a* and 315-*b* may overlap.

The BS may transmit control signaling to the UE 115-*c* indicating the configured set 310-*a* and the relay UE 115-*d*. Based on the control signaling, the UE 115-*c* may establish a communications link (such as the sidelink connection 325) with the UE 115-*d* and determine the activated subset 315-*a*. In some implementations, the UE 115-*c* may not be aware of the activated subset 315-*b* connected to the relay UE 115-*d*. The BS may have knowledge and responsibility to configure the relay UE 115-*d* to facilitate L1 or L2 mobility for the UE 115-*c*. Additionally, or alternatively, the BS may provide the UE 115-*c* with information about the configured set 310-*b* or the activated subset 315-*b* serving the UE 115-*d*. By configuring the relay UE 115-*d* to support L1 or L2 mobility for the UE 115-*c*, the BS may effectively increase the quantity of cells 305 in the activated subset 315 for the UE 115-*c*, which may improve communications reliability for the UE 115-*c* while moving within an area.

Figure 4:
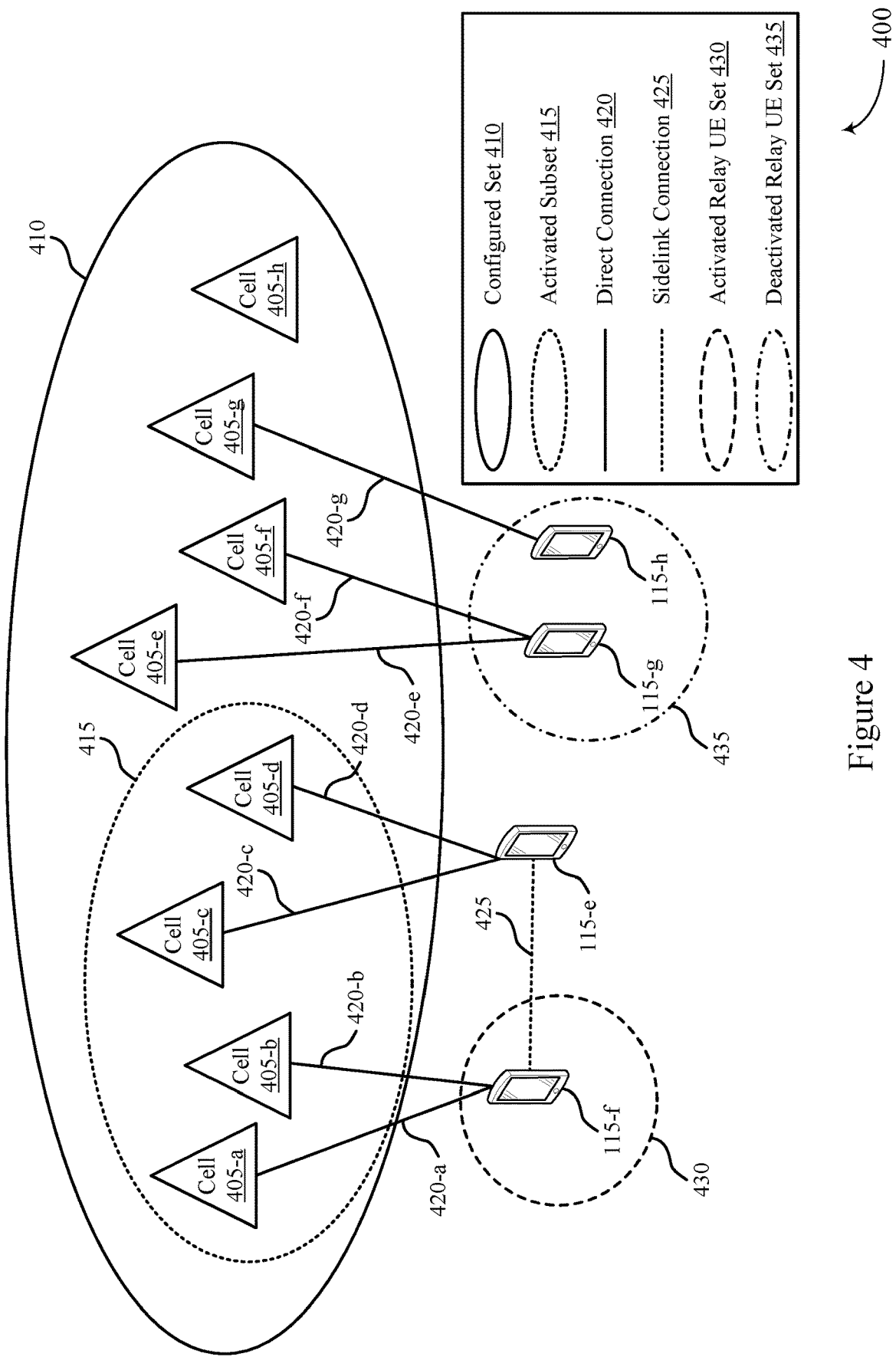

FIG. 4 shows an example wireless communications system 400 that supports mobility signaling for relay activation. In some implementations, the wireless communications system 400 may implement aspects of wireless communications system 100, depicted and described in FIG. 1. For example, the wireless communications system 400 may include a set of UEs 115 in communication with a set of cells 405 associated with a BS (not shown), such as the BS 105 depicted and described in FIG. 1, or one of the BS 105-*a* and the BS 105-*b* depicted and described in FIG. 2. A UE 115-*e* may be configured with a configured set 410 of cells 405 for L1 or L2 mobility. The UE 115-*e* may be connected via direct connections 420 with cells 405 of an activated subset 415, where the configured set 410 includes the activated subset 415. In some implementations, the direct connections 420 may be examples of the communications links 125 described with reference to FIG. 1.

In some implementations, the BS may determine to configure a set of relay UEs 115 to relay communications for the UE 115-*e*, for example via sidelink connections 425. The configured set of relay UEs 115 may include a UE 115-*f*, a UE 115-*g*, and a UE 115-*h*. In some implementations, the BS may configure the set of relay UEs 115 based on determining that the BS serves the set of relay UEs 115. Each relay UE 115 of the configured set of relay UEs 115 may be connected via direct connections 420 with cells 405 of the configured set 410.

Based on configuring the set of relay UEs 115, the BS may explicitly or implicitly update the configured set 410 and the activated subset 415 for the UE 115-*e*. The BS may transmit control signaling to the UE 115-*e* indicating the configured set 410 and the set of relay UEs 115. Based on the control signaling, the UE 115-*e* may establish communications links (such as including the sidelink connection 425) with relay UEs 115 of an activated relay UE set 430, which may include the UE 115-*f*. The UEs 115-*g* and 115-*h* may be included in a deactivated relay UE set 435, where the UEs 115-*g* and 115-*h* may be readily activated to serve the UE 115-*e* based on L1 or L2 signaling. In some implementations, the BS may configure the UE 115-*e* to autonomously activate or deactivate relay UEs 115 based on the mobility of the UE 115-*e*, and report the activation or deactivation to the BS. For example, the UE 115-*e* may transmit activation signaling to the UE 115-*f* to add the UE 115-*f* to the activated relay UE set 430, and report the activation to the BS. In some implementations, the UE 115-*f* may transmit signaling (such as via L1 or L2 signaling) to the BS informing the BS of the activation signaling it received from the UE 115-*e*.

In some implementations, the UE 115-*e* may transmit signaling indicating one or more candidate relay UEs 115 to the BS. The UE 115-*e* may select the candidate relay UEs 115 based on a sidelink channel quality, or based on positioning information for the candidate relay UEs 115. In some implementations, the UE 115-*e* may identify the one or more candidate relay UEs 115 as the UE 115-*e* moves about an area covered by the cells 405. In some implementations, the UE 115-*e* may perform a discovery procedure to identify the candidate relay UEs 115. The UE 115-*e* may select the candidate relay UEs 115 based on determining that the BS serves the candidate relay UEs 115. For example, the UE 115-*e* may compare a PCID of a serving cell for a candidate relay UE 115 to a list of PCIDs provided by a serving cell of the UE 115-*e*. Additionally, or alternatively, the candidate relay UE 115 may provide a BS identifier, and the UE 115-*e* may compare the provided BS identifier with the BS identifier associated with the BS to determine that the BS serves the candidate relay UE 115.

In some implementations, the BS may manage the configured set of relay UEs 115 using L3 signaling (such as RRC signaling, which may include the control signaling), and the activated relay UE set 430 and the deactivated relay UE set 435 may be managed by L1 or L2 signaling. That is, the BS may provide the UE 115-*e* and the relay UEs 115 with a configuration via RRC signaling that allows for L1 or L2 mobility. For example, the UE 115-*e* may maintain a list of configured relay UEs 115, where a subset of the relay UEs 115 may be designated as activated and the remaining relay UEs 115 may be deactivated. In some implementations, each configured relay UE 115 may maintain information about the UE 115-*e*, an activation status of the configured relay UE 115, a logic channel identifier (LCID) mapping between direct connections 420 (which may be referred to as a Uu link) and sidelink connections 425, other configuration parameters associated with the sidelink connections 425, or any combination thereof. In some implementations, the BS may provide the L1 or L2 mobility configuration for the configured relay UEs 115 when the BS configures the relay UEs 115 to relay communications for the UE 115-*e*. Additionally, or alternatively, the BS may provide the L1 or L2 mobility configuration in a separate reconfiguration. The BS may provide the reconfiguration via a direct connection 420 or via a sidelink connection 425.

Figure 5:
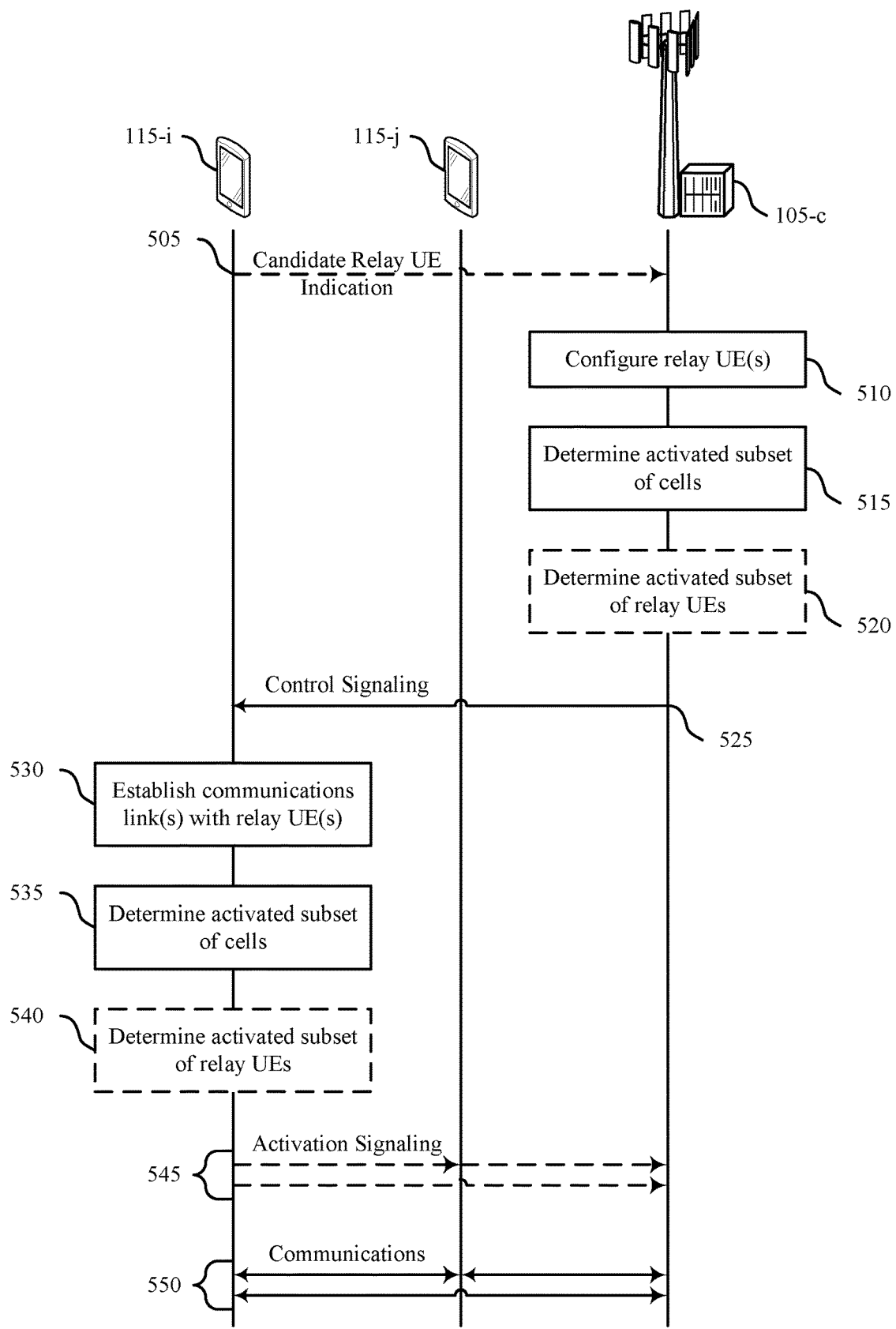
FIG. 5 shows an example process flow that supports mobility signaling for relay activation.

FIG. 5 shows an example process flow 500 that supports mobility signaling for relay activation. In some implementations, the process flow 500 may be implemented by or may implement aspects of the wireless communications systems 100, depicted and described in FIG. 1. In one aspect, the process flow 500 may include example operations associated with a set of UEs 115 and a BS 105-*c*. In the following description of the process flow 500, the operations between the UEs 115 and the BS 105-*c* may be performed in a different order than the example order shown, or the operations performed by the UEs 115 and the BS 105-*c* may be performed in different orders or at different times. Some operations also may be omitted from the process flow 500, and other operations may be added to the process flow 500.

In some implementations, at 505, a UE 115-*i* may transmit signaling indicating one or more candidate relay UEs 115 to the BS 105-*c*. The candidate relay UEs 115 may include a relay UE 115-*j*. In some implementations, the UE 115-*i* may identify the candidate relay UEs 115 based on sidelink channel quality or positions of the candidate relay UEs, or a discovery procedure.

At 510, the BS 105-*c* may configure a set of relay UEs 115 to relay communications for the UE 115-*i*, for example via sidelink communications. In some implementations, the BS 105-c may configure the set of relay UEs 115 based on the signaling indicating the candidate relay UEs 115, where the configured set of relay UEs 115 may include one or more of the indicated candidate relay UEs 115. For example, the configured set of relay UEs 115 may include the relay UE 115-j. In some implementations, the BS 105-c may configure the set of relay UEs 115 based on determining that the BS 105-c serves the set of relay UEs 115.

At 515, the BS 105-c may determine an activated subset of cells that may serve the UE 115-i for data and control transfer. The activated subset of cells may be included in a set of cells configured for serving the UE 115-i to enable mobility within an area. In some implementations, at 520, the BS 105-c may determine an activated subset of cells for the relay UEs 115 to effectively increase the quantity of cells in the activated subset of cells for the UE 115-i.

At 525, the BS 105-c may transmit control signaling to the UE 115-i indicating the configured set of cells and the configured set of relay UEs 115. In some implementations, the BS 105-c may transmit the control signaling via L3 signaling or RRC signaling. In some implementations, the BS 105-c may configure the UE 115-i via the control signaling to autonomously activate or deactivate relay UEs 115 based on the mobility of the UE 115-i, and report the activation or deactivation to the BS 105-c.

At 530, the UE 115-i may establish communications links with relay UEs 115 of the configured set of relay UEs 115 based on the control signaling. In some implementations, the communications links may include sidelink connections. For example, the UE 115-i may establish a sidelink connection with the UE 115-j.

At 535, the UE 115-i may determine the activated subset of cells serving the UE 115-i via direct connections. In some implementations, the UE 115-i may not be aware of the activated subset of cells connected to the relay UEs 115 (such as the relay UE 115-j). The BS 105-c may have knowledge and responsibility to configure the relay UEs 115 to facilitate L1 or L2 mobility for the UE 115-i.

In some implementations, at 540, the UE 115-i may determine the activated subset of relay UEs 115. The UE 115-i may determine the activated subset of relay UEs 115 based on receiving the control signaling, establishing the communication links, or both. For example, the UE 115-i may maintain a list of configured relay UEs 115, where a subset of the relay UEs 115 may be designated as activated and the remaining relay UEs 115 may be deactivated.

In some implementations, at 545, the UE 115-i may transmit activation signaling to the UE 115-j to add the UE 115-j to the activated subset of relay UEs 115, and report the activation to the BS 105-c. In some implementations, the UE 115-j may transmit signaling (such as via L1 or L2 signaling) to the BS 105-c informing the BS 105-c of the activation signaling it received from the UE 115-i. The UE 115-i may transmit the activation signaling based on the BS 105-c configuring the UE 115-i to autonomously activate or deactivate relay UEs 115 based on the mobility of the UE 115-i.

At 550, the UE 115-i may communicate with the BS 105-c. The UE 115-i may communicate control or data signaling via a direct connection with a cell in the activated subset of cells, or via a sidelink connection with a relay UE 115 (such as the relay UE 115-j). The operations performed by the UEs 115 and the BS 105-c may promote improvements to efficiency and reliability for communications between the UE 115-i and the BS 105-c, among other benefits.

Figure 6:
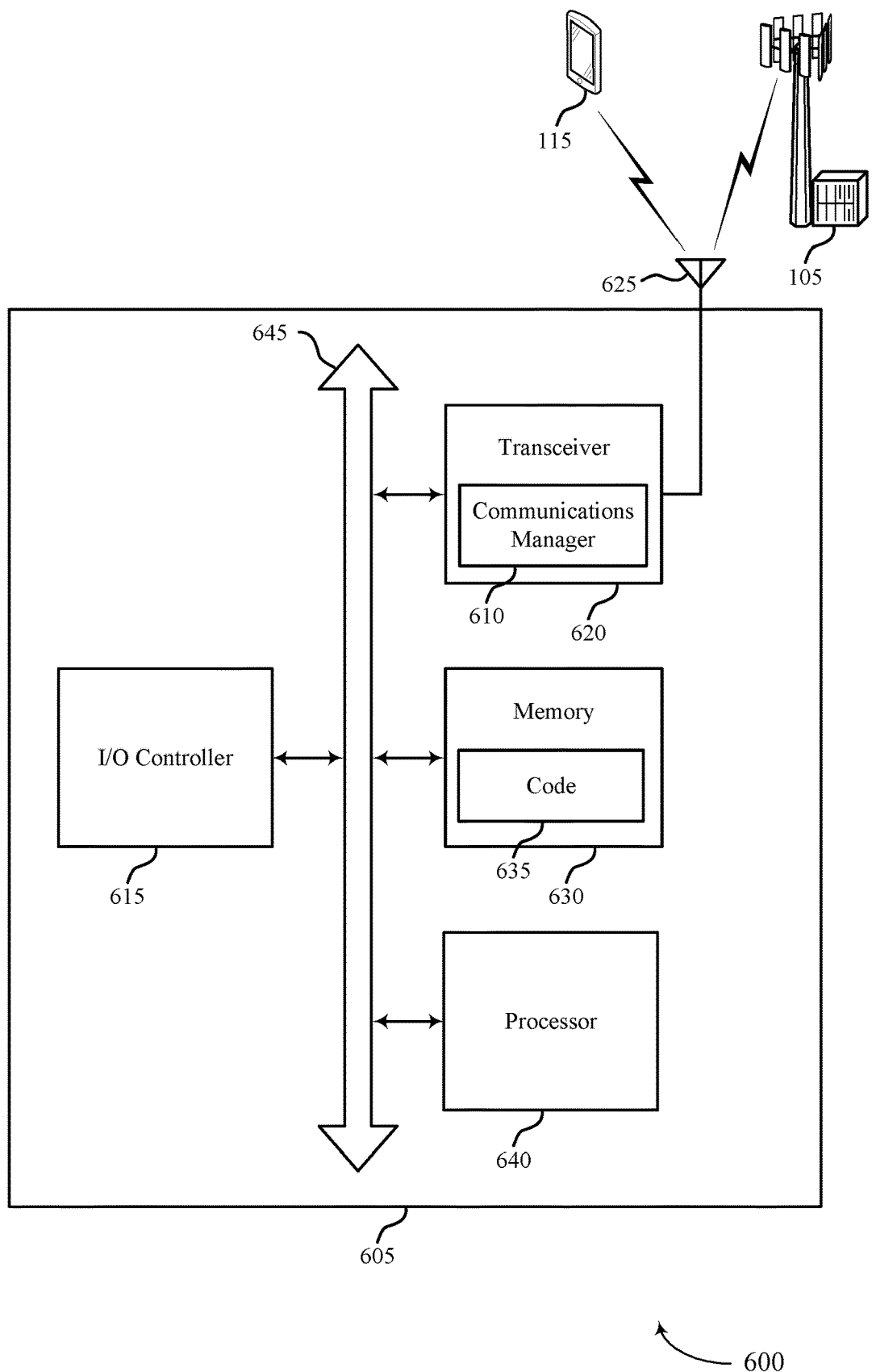
FIGS. 6 and 7 show example systems including example devices that support mobility signaling for relay activation.

FIG. 6 shows a diagram of a system 600 including an example device 605 that supports mobility signaling for relay activation. The device 605 may be an example of or include the components of a UE 115 as described herein. The device 605 may include components for bi-directional voice and data communications including components for transmitting and receiving communications, including a communications manager 610, an input/output (I/O) controller 615, a transceiver 620, an antenna 625, memory 630, and a processor 640. These components may be in electronic communication via one or more buses (for example, bus 645).

The communications manager 610 may receive, from a BS, control signaling indicating a relay UE and a set of cells associated with the BS, the relay UE configured for relaying communications with the BS. The communications manager 610 may establish a communications link with the relay UE based on receiving the control signaling. The communications manager 610 may determine an activated subset of cells in the set of cells based on receiving the control signaling and establishing the communications link. The communications manager 610 may communicate with the BS via the relay UE and the activated subset of cells based on determining the activated subset of cells.

In some implementations, the communications manager 610, when functioning as a processor or a processing system, may obtain signaling from a receiver, such as the transceiver 620, using a first interface and may output signaling for transmission via a transmitter, such as the transceiver 620, using the first interface or a second interface.

The I/O controller 615 may manage input and output signals for the device 605. The I/O controller 615 also may manage peripherals not integrated into the device 605. In some implementations, the I/O controller 615 may represent a physical connection or port to an external peripheral. In some implementations, the I/O controller 615 may utilize an operating system such as iOS®, ANDROID®, MS-DOS®, MS-WINDOWS®, OS/2®, UNIX®, LINUX®, or another known operating system. In some other examples, the I/O controller 615 may represent or interact with a modem, a keyboard, a mouse, a touchscreen, or a similar device. In some implementations, the I/O controller 615 may be implemented as part of a processor. In some implementations, a user may interact with the device 605 via the I/O controller 615 or via hardware components controlled by the I/O controller 615.

The transceiver 620 may communicate bi-directionally, via one or more antennas, wired, or wireless links as described herein. For example, the transceiver 620 may represent a wireless transceiver and may communicate bi-directionally with another wireless transceiver. The transceiver 620 also may include a modem to modulate the packets and provide the modulated packets to the antennas for transmission, and to demodulate packets received from the antennas.

In some implementations, the wireless device may include a single antenna 625. However, in some implementations the device may have more than one antenna 625, which may be capable of concurrently transmitting or receiving multiple wireless transmissions.

The memory 630 may include random-access memory (RAM) and read-only memory (ROM). The memory 630 may store computer-readable, computer-executable code 635 including instructions that, when executed, cause the processor to perform various functions described herein. In some implementations, the memory 630 may contain, among other things, a basic I/O system (BIOS) which may control basic hardware or software operation such as the interaction with peripheral components or devices.

The processor 640 may include a hardware device, (for example, a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some implementations, the processor 640 may be configured to operate a memory array using a memory controller. In some other examples, a memory controller may be integrated into the processor 640. The processor 640 may be configured to execute computer-readable instructions stored in a memory (for example, the memory 630) to cause the device 605 to perform various functions (for example, functions or tasks supporting slot identification for semi-persistent scheduling (SPS) and configured grant transmissions).

The processor 640 may be any one or more suitable processors capable of executing scripts or instructions of one or more software programs stored in the device 605 (such as within the memory 630). For example, the processor 640 may execute the communications manager 610 or the I/O controller 615.

In some implementations, the processor 640 may be a component of a processing system. A processing system may generally refer to a system or series of machines or components that receives inputs and processes the inputs to produce a set of outputs (which may be passed to other systems or components of, for example, the device 605). For example, a processing system of the device 605 may refer to a system including the various other components or subcomponents of the device 605.

The processing system of the device 605 may interface with other components of the device 605, and may process information received from other components (such as inputs or signals), output information to other components, and the like. For example, a chip or modem of the device 605 may include a processing system, a first interface to output information transmission, and a second interface to obtain information received over a wireless channel. In some implementations, the first interface may refer to an interface between the processing system of the chip or modem and a transmitter, such that the device 605 may transmit information output from the chip or modem. In some implementations, the second interface may refer to an interface between the processing system of the chip or modem and a receiver, such that the device 605 may obtain information or signal inputs, and the information may be passed to the processing system. A person having ordinary skill in the art will readily recognize that the first interface also may obtain information or signal inputs, and the second interface also may output information or signal outputs.

The code 635 may include instructions to implement aspects of the present disclosure, including instructions to support wireless communications. The code 635 may be stored in a non-transitory computer-readable medium such as system memory or other type of memory. In some implementations, the code 635 may not be directly executable by the processor 640 but may cause a computer (for example, when compiled and executed) to perform functions described herein.

In some implementations, the communications manager 610 may be implemented as an integrated circuit or chipset for a mobile device modem, and a receiver and a transmitter may be implemented as analog components (for example, amplifiers, filters, antennas) coupled with the mobile device modem to enable wireless transmission and reception over one or more bands.

Figure 7:
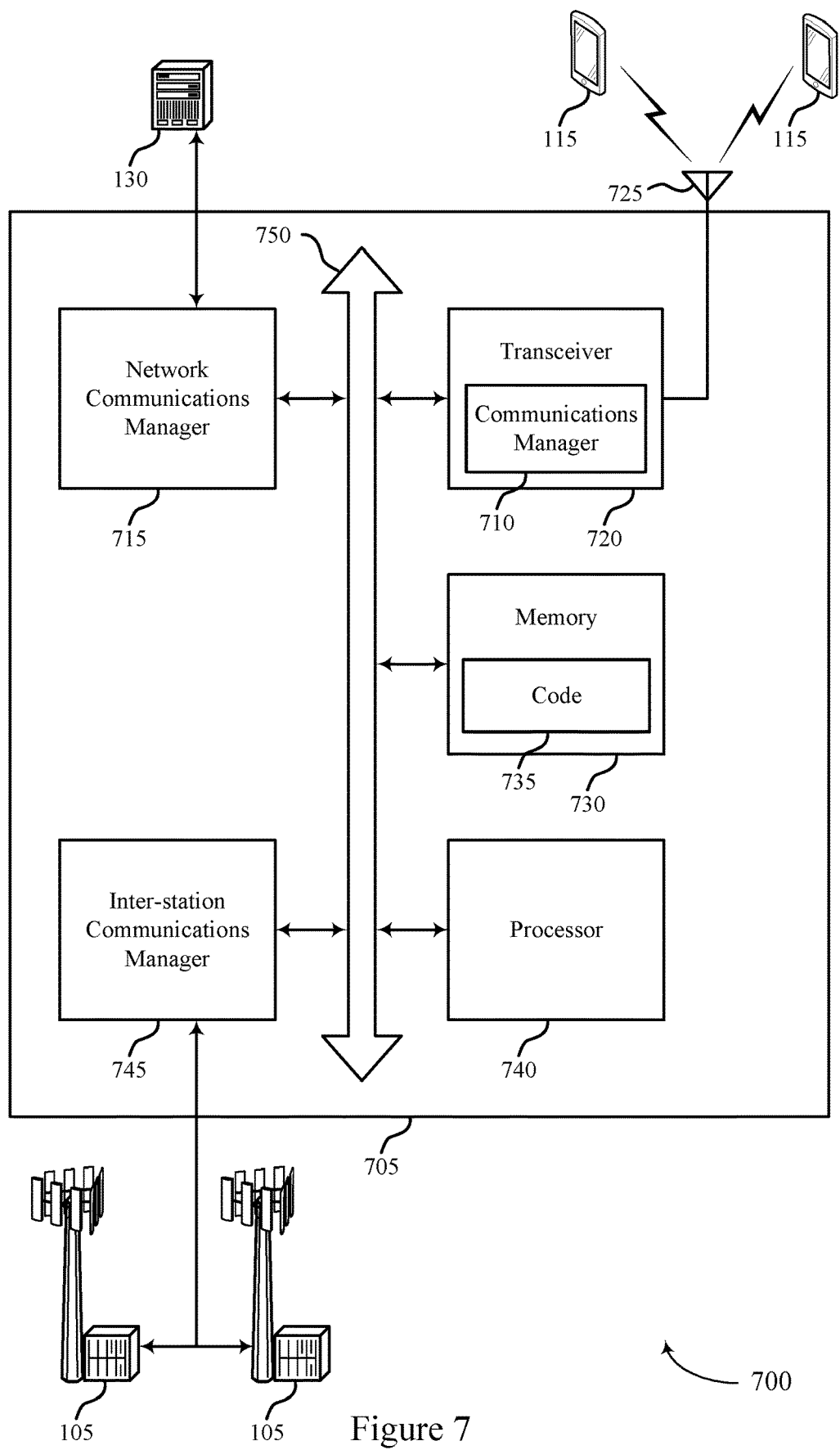

FIG. 7 shows a diagram of a system 700 including an example device 705 that supports mobility signaling for relay activation. The device 705 may be an example of or include the components of a BS 105 as described herein. The device 705 may include components for bi-directional voice and data communications including components for transmitting and receiving communications, including a communications manager 710, a network communications manager 715, a transceiver 720, an antenna 725, memory 730, a processor 740, and an inter-station communications manager 745. These components may be in electronic communication via one or more buses (for example, bus 750).

The communications manager 710 may configure a relay UE for relaying communications with a UE. The communications manager 710 may determine an activated subset of cells in a set of cells associated with the BS based on configuring the relay UE. The communications manager 710 may transmit, to the UE, control signaling indicating the relay UE and the set of cells. The communications manager 710 may communicating with the UE via the relay UE and the activated subset of cells based on transmitting the control signaling.

In some implementations, the communications manager 710, when functioning as a processor or a processing system, may obtain the signaling from a receiver, such as the transceiver 720, using a first interface or a second interface, and may output signaling for transmission via a transmitter, such as the transceiver 720, using the first interface or the second interface.

The network communications manager 715 may manage communications with the core network (for example, via one or more wired backhaul links). For example, the network communications manager 715 may manage the transfer of data communications for client devices, such as one or more UEs 115.

The transceiver 720 may communicate bi-directionally, via one or more antennas, wired, or wireless links as described herein. For example, the transceiver 720 may represent a wireless transceiver and may communicate bi-directionally with another wireless transceiver. The transceiver 720 also may include a modem to modulate the packets and provide the modulated packets to the antennas for transmission, and to demodulate packets received from the antennas.

In some implementations, the wireless device may include a single antenna 725. However, in some implementations the device may have more than one antenna 725, which may be capable of concurrently transmitting or receiving multiple wireless transmissions.

The memory 730 may include RAM, ROM, or a combination thereof. The memory 730 may store computer-readable code 735 including instructions that, when executed by a processor (for example, the processor 740) cause the device to perform various functions described herein. In some implementations, the memory 730 may contain, among other things, a BIOS which may control basic hardware or software operation such as the interaction with peripheral components or devices.

The processor 740 may include an intelligent hardware device, (for example, a general-purpose processor, a DSP, a CPU, a microcontroller, an ASIC, an FPGA, a programmable logic device, a discrete gate or transistor logic component, a discrete hardware component, or any combination thereof). In some implementations, the processor 740 may be configured to operate a memory array using a memory controller. In some implementations, a memory controller may be integrated into processor 740. The processor 740 may be configured to execute computer-readable instructions stored in a memory (for example, the memory 730) to cause the device 705 to perform various functions (for example, functions or tasks supporting slot identification for SPS and configured grant transmissions).

The inter-station communications manager 745 may manage communications with other BSs 105, and may include a controller or scheduler for controlling communications with UEs 115 in cooperation with other BSs 105. For example, the inter-station communications manager 745 may coordinate scheduling for transmissions to UEs 115 for various interference mitigation techniques such as beamforming or joint transmission. In some implementations, the inter-station communications manager 745 may provide an X2 interface within an LTE/LTE-A wireless communication network technology to provide communication between BSs 105.

The code 735 may include instructions to implement aspects of the present disclosure, including instructions to support wireless communications. The code 735 may be stored in a non-transitory computer-readable medium such as system memory or other type of memory. In some implementations, the code 735 may not be directly executable by the processor 740 but may cause a computer (for example, when compiled and executed) to perform functions described herein.

Figure 8:
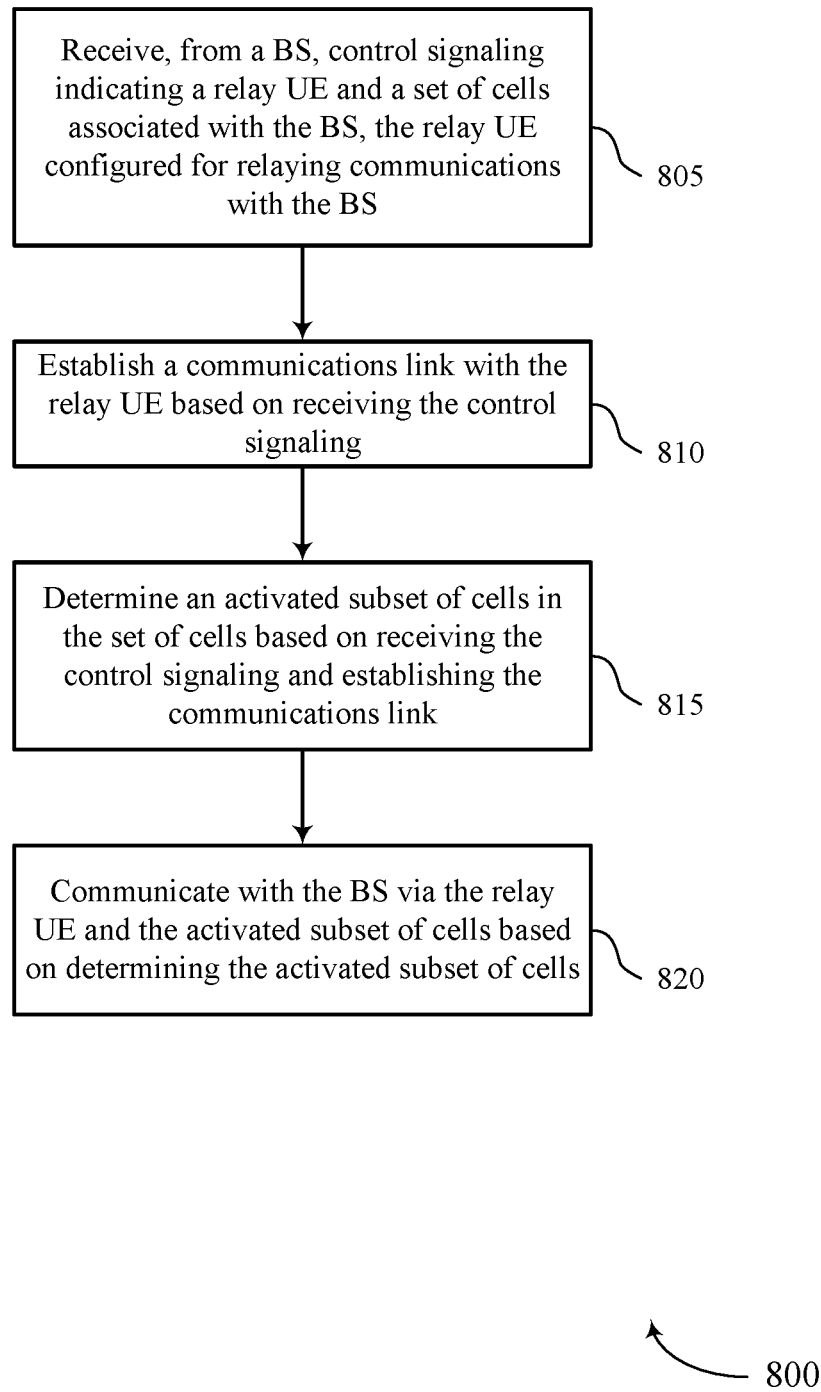
FIGS. 8-11 show flowcharts illustrating example methods that support mobility signaling for relay activation.

FIG. 8 shows a flowchart illustrating a method 800 that supports mobility signaling for relay activation. The operations of method 800 may be implemented by a UE 115 or its components as described herein. For example, the operations of method 800 may be performed by a communications manager as described with reference to FIG. 6. In some implementations, a UE may execute a set of instructions to control the functional elements of the UE to perform the functions described below. Additionally, or alternatively, a UE may perform aspects of the functions described below using special-purpose hardware.

At 805, the UE may receive, from a BS, control signaling indicating a relay UE and a set of cells associated with the BS, the relay UE configured for relaying communications with the BS. The operations of 805 may be performed according to the methods described herein.

At 810, the UE may establish a communications link with the relay UE based on receiving the control signaling. The operations of 810 may be performed according to the methods described herein.

At 815, the UE may determine an activated subset of cells in the set of cells based on receiving the control signaling and establishing the communications link. The operations of 815 may be performed according to the methods described herein.

At 820, the UE may communicate with the BS via the relay UE and the activated subset of cells based on determining the activated subset of cells. The operations of 820 may be performed according to the methods described herein.

Figure 9:
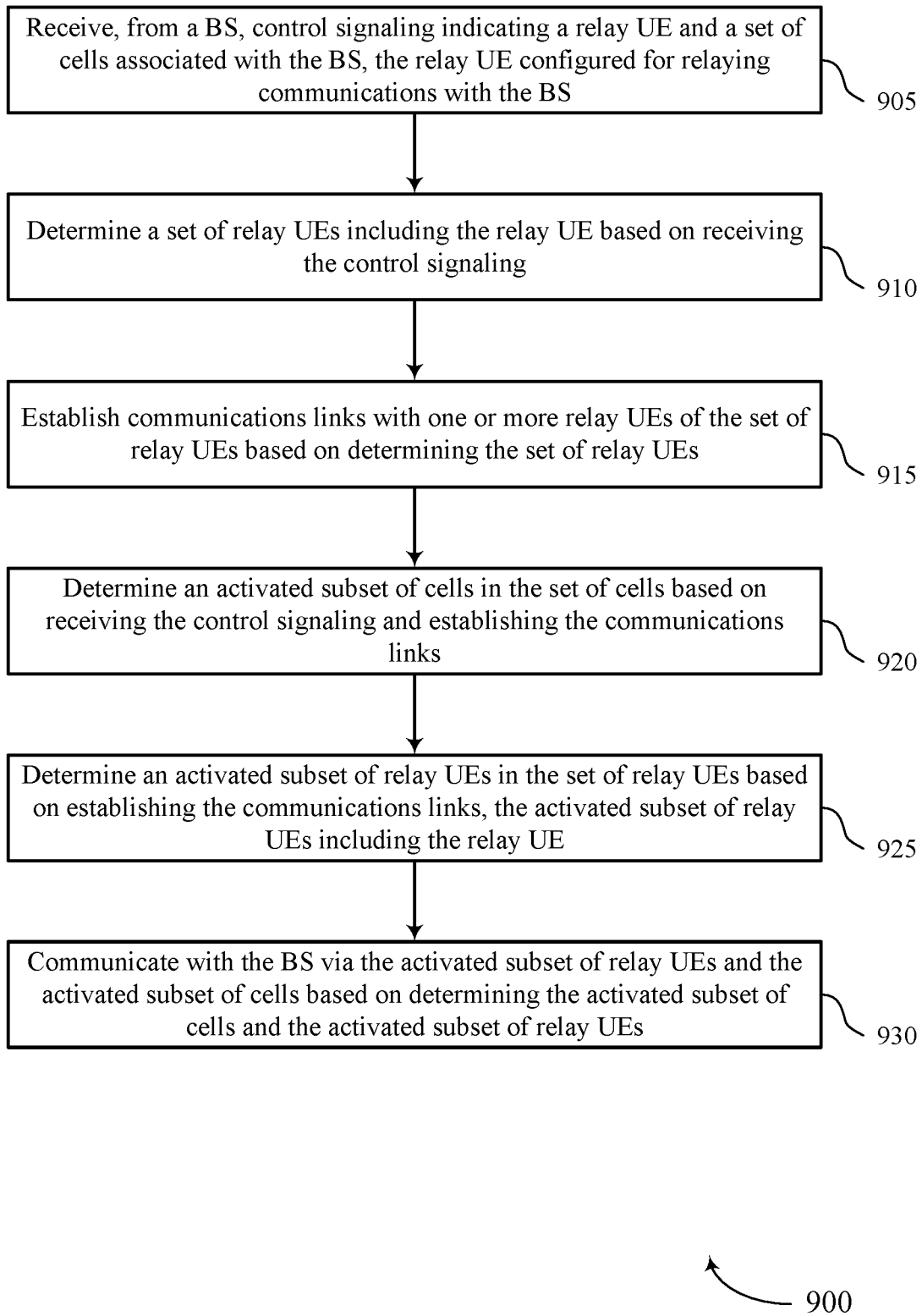

FIG. 9 shows a flowchart illustrating a method 900 that supports mobility signaling for relay activation. The operations of method 900 may be implemented by a UE 115 or its components as described herein. For example, the operations of method 900 may be performed by a communications manager as described with reference to FIG. 6. In some implementations, a UE may execute a set of instructions to control the functional elements of the UE to perform the functions described below. Additionally, or alternatively, a UE may perform aspects of the functions described below using special-purpose hardware.

At 905, the UE may receive, from a BS, control signaling indicating a relay UE and a set of cells associated with the BS, the relay UE configured for relaying communications with the BS. The operations of 905 may be performed according to the methods described herein.

At 910, the UE may determine a set of relay UEs including the relay UE based on receiving the control signaling. The operations of 910 may be performed according to the methods described herein.

At 915, the UE may establish communications links with one or more relay UEs of the set of relay UEs based on determining the set of relay UEs. The operations of 915 may be performed according to the methods described herein.

At 920, the UE may determine an activated subset of cells in the set of cells based on receiving the control signaling and establishing the communications links. The operations of 920 may be performed according to the methods described herein.

At 925, the UE may determine an activated subset of relay UEs in the set of relay UEs based on establishing the communications links, the activated subset of relay UEs including the relay UE. The operations of 925 may be performed according to the methods described herein.

At 930, the UE may communicate with the BS via the activated subset of relay UEs and the activated subset of cells based on determining the activated subset of cells and the activated subset of relay UEs. The operations of 930 may be performed according to the methods described herein.

Figure 10:
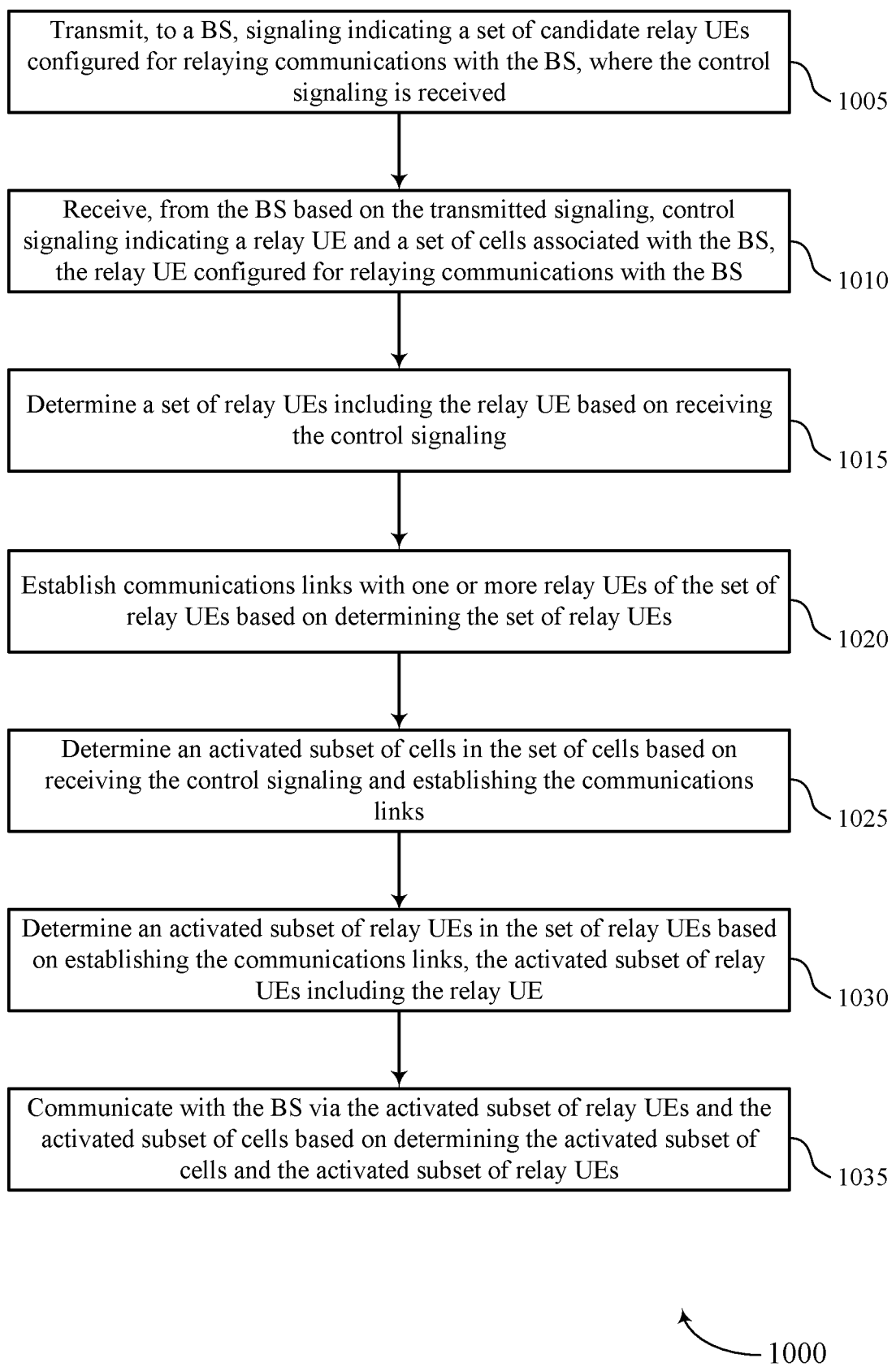

FIG. 10 shows a flowchart illustrating a method 1000 that supports mobility signaling for relay activation. The operations of method 1000 may be implemented by a UE 115 or its components as described herein. For example, the operations of method 1000 may be performed by a communications manager as described with reference to FIG. 6. In some implementations, a UE may execute a set of instructions to control the functional elements of the UE to perform the functions described below. Additionally, or alternatively, a UE may perform aspects of the functions described below using special-purpose hardware.

At 1005, the UE may transmit, to a BS, signaling indicating a set of candidate relay UEs configured for relaying communications with the BS, where the control signaling is received. The operations of 1005 may be performed according to the methods described herein.

At 1010, the UE may receive, from the BS based on the transmitted signaling, control signaling indicating a relay UE and a set of cells associated with the BS, the relay UE configured for relaying communications with the BS. The operations of 1010 may be performed according to the methods described herein.

At 1015, the UE may determine a set of relay UEs including the relay UE based on receiving the control signaling. The operations of 1015 may be performed according to the methods described herein.

At 1020, the UE may establish communications links with one or more relay UEs of the set of relay UEs based on determining the set of relay UEs. The operations of 1020 may be performed according to the methods described herein.

At 1025, the UE may determine an activated subset of cells in the set of cells based on receiving the control signaling and establishing the communications links. The operations of 1025 may be performed according to the methods described herein.

At 1030, the UE may determine an activated subset of relay UEs in the set of relay UEs based on establishing the communications links, the activated subset of relay UEs including the relay UE. The operations of 1030 may be performed according to the methods described herein.

At 1035, the UE may communicate with the BS via the activated subset of relay UEs and the activated subset of cells based on determining the activated subset of cells and the activated subset of relay UEs. The operations of 1035 may be performed according to the methods described herein.

Figure 11:
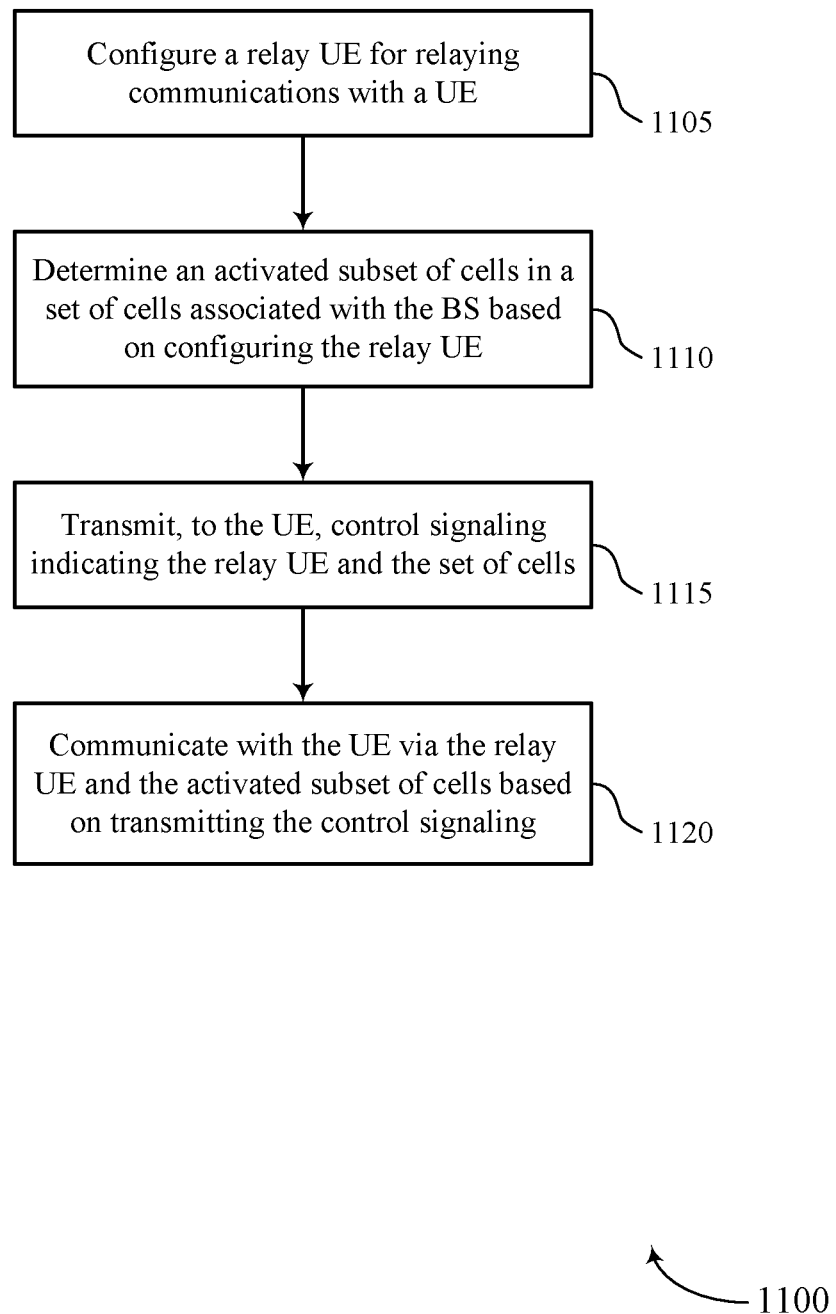

FIG. 11 shows a flowchart illustrating a method 1100 that supports mobility signaling for relay activation. The operations of method 1100 may be implemented by a BS 105 or its components as described herein. For example, the operations of method 1100 may be performed by a communications manager as described with reference to FIG. 7. In some implementations, a BS may execute a set of instructions to control the functional elements of the BS to perform the functions described below. Additionally, or alternatively, a BS may perform aspects of the functions described below using special-purpose hardware.

At 1105, the BS may configure a relay UE for relaying communications with a UE. The operations of 1105 may be performed according to the methods described herein.

At 1110, the BS may determine an activated subset of cells in a set of cells associated with the BS based on configuring the relay UE. The operations of 1110 may be performed according to the methods described herein.

At 1115, the BS may transmit, to the UE, control signaling indicating the relay UE and the set of cells. The operations of 1115 may be performed according to the methods described herein.

At 1120, the BS may communicate with the UE via the relay UE and the activated subset of cells based on transmitting the control signaling. The operations of 1120 may be performed according to the methods described herein.

The following provides an overview of aspects of the present disclosure:

Aspect 1: An apparatus for wireless communications at an apparatus of a UE, including: a first interface configured to: obtain, from a BS, control signaling indicating a relay UE and a set of cells associated with the BS, the relay UE configured for relaying communications with the BS; a processing system configured to: establish a communications link with the relay UE based on receiving the control signaling; and determine an activated subset of cells in the set of cells based on receiving the control signaling and establishing the communications link; and the first interface or a second interface is configured to: communicate with the BS via the relay UE and the activated subset of cells based on determining the activated subset of cells.

Aspect 2: The apparatus of aspect 1, where: the processing system is further configured to: determine a set of relay UEs including the relay UE based on receiving the control signaling; establish communications links with one or more relay UEs of the set of relay UEs based on determining the set of relay UEs; and determine an activated subset of relay UEs in the set of relay UEs based on establishing the communications links, the activated subset of relay UEs including the relay UE; and the first interface or the second interface is further configured to: communicate with the BS via the activated subset of relay UEs based on determining the activated subset of relay UEs.

Aspect 3: The apparatus of aspect 2, where: the first interface or the second interface is further configured to: output activation signaling for transmission to the one or more relay UEs, where the activation signaling indicates an activation of the one or more relay UEs for relaying communications with the BS; and output signaling for transmission to the BS indicating the activation of the one or more relay UEs for relaying communications with the BS.

Aspect 4: The apparatus of any of aspects 2 through 3, where: the first interface or the second interface is further configured to: output, for transmission to the BS, signaling indicating a set of candidate relay UEs configured for relaying communications with the BS, where the control signaling is received based on the transmitted signaling.

Aspect 5: The apparatus of aspect 4, where: the set of relay UEs include one or more candidate relay UEs of the set of candidate relay UEs.

Aspect 6: The apparatus of any of aspects 4 through 5, where: the processing system is further configured to: determine a respective sidelink channel quality associated with each candidate relay UE of the set of candidate relay UEs, where the transmitted signaling is based on determining the respective sidelink channel quality.

Aspect 7: The apparatus of aspect 6, where: the first interface or the second interface is further configured to: output, for transmission to the BS, a report indicating the respective sidelink channel quality associated with each candidate relay UE of the set of candidate relay UEs, where receiving the control signaling is further based on transmitting the report.

Aspect 8: The apparatus of any of aspects 4 through 7, where: the processing system is further configured to: perform a discovery procedure to identify the set of candidate relay UEs, where the transmitted signaling is based on performing the discovery procedure.

Aspect 9: The apparatus of any of aspects 4 through 8, where: the processing system is further configured to: determine that the BS includes serving cells for the set of candidate relay UEs, where the transmitted signaling is based on determining that the BS includes the serving cells for the set of candidate relay UEs.

Aspect 10: The apparatus of any of aspects 1 through 9, where: the processing system is further configured to: determine that the BS includes a serving cell for the relay UE, where establishing the communications link with the relay UE is further based on determining that the BS includes the serving cell of the relay UE.

Aspect 11: The apparatus of any of aspects 1 through 10, where: the first interface or the second interface is further configured to: obtain second control signaling indicating mobility information for the set of cells, the relay UE, or both; and the processing system is further configured to update the activated subset of cells in the set of cells based on receiving the second control signaling, where communicating with the BS is further based on updating the activated subset of cells.

Aspect 12: The apparatus of any of aspects 1 through 11, where: the processing system is further configured to: determine a second activated subset of cells associated with communications between the BS and the relay UE based on establishing the communications link, where determining the activated subset of cells is based on determining the second activated subset of cells.

Aspect 13: The apparatus of aspect 12, where: the processing system is further configured to: determine a second set of cells associated with communications between the BS and the relay UE, where the second set of cells include the second activated subset of cells.

Aspect 14: The apparatus of any of aspects 12 through 13, where: the activated subset of cells includes the second activated subset of cells.

Aspect 15: The apparatus of any of aspects 1 through 14, where: the processing system is further configured to: determine that the relay UE supports mobility signaling, where establishing the communications link with the relay UE is further based on determining that the relay UE supports mobility signaling.

Aspect 16: The apparatus of any of aspects 1 through 15, where: the communications link with the relay UE includes a sidelink connection.

Aspect 17: The apparatus of any of aspects 1 through 16, where: the set of cells are supported by one or more DUs under a common CU of the BS.

Aspect 18: The apparatus of aspect 17, where: the one or more DUs include a common DU that supports each cell of the set of cells.

Aspect 19: An apparatus for wireless communications at an apparatus of a BS, including: a processing system configured to: configure a relay UE for relaying communications with a UE; and determine an activated subset of cells in a set of cells associated with the BS based on configuring the relay UE; a first interface configured to: output, for transmission to the UE, control signaling indicating the relay UE and the set of cells; and the first interface or a second interface configured to: communicate with the UE via the relay UE and the activated subset of cells based on transmitting the control signaling.

Aspect 20: The apparatus of aspect 19, where: the processing system is further configured to: configure a set of relay UEs including the relay UE, where the control signaling indicates the set of relay UEs; and determine an activated subset of relay UEs in the set of relay UEs based on configuring the set of relay UEs, the activated subset of relay UEs including the relay UE; and the first interface or the second interface is further configured to: communicate with the UE via the activated subset of relay UEs based on determining the activated subset of relay UEs.

Aspect 21: The apparatus of aspect 20, where: the first interface or the second interface is further configured to: obtain, from the UE, signaling indicating an activation of one or more relay UEs for relaying communications with the BS; and the processing system is further configured to: update the activated subset of relay UEs in the set of relay UEs based on receiving the signaling, where communicating with the UE is further based on updating the activated subset of relay UEs.

Aspect 22: The apparatus of aspect 21, where: the first interface or the second interface is further configured to: obtain, from the one or more relay UEs, second signaling indicating the activation of the one or more relay UEs for relaying communications with the BS, where updating the activated subset of relay UEs in the set of relay UEs is further based on receiving the second signaling.

Aspect 23: The apparatus of any of aspects 20 through 22, where: the first interface or the second interface is further configured to: obtain, from the UE, signaling indicating a set of one or more candidate relay UEs configured for relaying communications with the UE, where configuring the set of relay UEs is based on the received signaling.

Aspect 24: The apparatus of aspect 23, where: the set of relay UEs include one or more candidate relay UEs of the set of one or more candidate relay UEs.

Aspect 25: The apparatus of any of aspects 23 through 24, where: the first interface or the second interface is further configured to: obtain, from the UE, a report indicating a respective sidelink channel quality associated with each candidate relay UE of the one or more candidate relay UEs, where configuring the set of relay UEs is further based on receiving the report.

Aspect 26: The apparatus of any of aspects 19 through 25, where: the processing system is further configured to: determine that the BS includes a serving cell of the relay UE, where configuring the relay UE for relaying communications with the UE is further based on determining that the BS includes the serving cell of the relay UE.

Aspect 27: The apparatus of any of aspects 19 through 26, where: the first interface or the second interface is further configured to: obtain second control signaling indicating mobility information for the set of cells, the relay UE, or both; and the processing system is further configured to: update the activated subset of cells in the set of cells based on transmitting the second control signaling, where communicating with the UE is further based on updating the activated subset of cells.

Aspect 28: The apparatus of any of aspects 19 through 27, where: the processing system is further configured to: determine a second activated subset of cells associated with communications between the BS and the relay UE based on configuring the relay UE, where determining the activated subset of cells is based on determining the second activated subset of cells.

Aspect 29: The apparatus of aspect 28, where: the processing system is further configured to: determine a second set of cells associated with communications between the BS and the relay UE, where the second set of cells include the second activated subset of cells.

Aspect 30: The apparatus of any of aspects 28 through 29, where: the activated subset of cells includes the second activated subset of cells.

Aspect 31: The apparatus of any of aspects 19 through 30, where: the processing system is further configured to: determine that the relay UE supports mobility signaling, where configuring the relay UE is based on determining that the relay UE supports mobility signaling.

Aspect 32: The apparatus of any of aspects 19 through 31, where: the set of cells are supported by one or more DUs under a common CU of the BS.

Aspect 33: The apparatus of aspect 32, where: the one or more DUs include a common DU that supports each cell of the set of cells.

Aspect 34: A method for wireless communications at an apparatus of a UE, including: receiving, from a BS, control signaling indicating a relay UE and a set of cells associated with the BS, the relay UE configured for relaying communications with the BS; establishing a communications link with the relay UE based on receiving the control signaling; determining an activated subset of cells in the set of cells based on receiving the control signaling and establishing the communications link; and communicating with the BS via the relay UE and the activated subset of cells based on determining the activated subset of cells.

Aspect 35: The method of aspect 34, further including: determining a set of relay UEs including the relay UE based on receiving the control signaling; establishing communications links with one or more relay UEs of the set of relay UEs based on determining the set of relay UEs; determining an activated subset of relay UEs in the set of relay UEs based on establishing the communications links, the activated subset of relay UEs including the relay UE; and communicating with the BS via the activated subset of relay UEs based on determining the activated subset of relay UEs.

Aspect 36: The method of aspect 35, where establishing the communications links includes: transmitting activation signaling to the one or more relay UEs, where the activation signaling indicates an activation of the one or more relay UEs for relaying communications with the BS; and transmitting signaling to the BS indicating the activation of the one or more relay UEs for relaying communications with the BS.

Aspect 37: The method of any of aspects 35 through 36, further including: transmitting, to the BS, signaling indicating a set of candidate relay UEs configured for relaying communications with the BS, where the control signaling is received based on the transmitted signaling.

Aspect 38: The method of aspect 37, where the set of relay UEs include one or more candidate relay UEs of the set of candidate relay UEs.

Aspect 39: The method of any of aspects 37 through 38, further including: determining a respective sidelink channel quality associated with each candidate relay UE of the set of candidate relay UEs, where the transmitted signaling is based on determining the respective sidelink channel quality.

Aspect 40: The method of aspect 39, further including: transmitting, to the BS, a report indicating the respective sidelink channel quality associated with each candidate relay UE of the set of candidate relay UEs, where receiving the control signaling is further based on transmitting the report.

Aspect 41: The method of any of aspects 37 through 40, further including: performing a discovery procedure to identify the set of candidate relay UEs, where the transmitted signaling is based on performing the discovery procedure.

Aspect 42: The method of any of aspects 37 through 41, further including: determining that the BS includes serving cells for the set of candidate relay UEs, where the transmitted signaling is based on determining that the BS includes the serving cells for the set of candidate relay UEs.

Aspect 43: The method of any of aspects 34 through 42, further including: determining that the BS includes a serving cell for the relay UE, where establishing the communications link with the relay UE is further based on determining that the BS includes the serving cell of the relay UE.

Aspect 44: The method of any of aspects 34 through 43, further including: receiving second control signaling indicating mobility information for the set of cells, the relay UE, or both; and updating the activated subset of cells in the set of cells based on receiving the second control signaling, where communicating with the BS is further based on updating the activated subset of cells.

Aspect 45: The method of any of aspects 34 through 44, further including: determining a second activated subset of cells associated with communications between the BS and the relay UE based on establishing the communications link, where determining the activated subset of cells is based on determining the second activated subset of cells.

Aspect 46: The method of aspect 45, further including: determining a second set of cells associated with communications between the BS and the relay UE, where the second set of cells include the second activated subset of cells.

Aspect 47: The method of any of aspects 45 through 46, where the activated subset of cells includes the second activated subset of cells.

Aspect 48: The method of any of aspects 34 through 47, further including: determining that the relay UE supports mobility signaling, where establishing the communications link with the relay UE is further based on determining that the relay UE supports mobility signaling.

Aspect 49: The method of any of aspects 34 through 48, where the communications link with the relay UE includes a sidelink connection.

Aspect 50: The method of any of aspects 34 through 49, where the set of cells are supported by one or more DUs under a common CU of the BS.

Aspect 51: The method of aspect 50, where the one or more DUs include a common DU that supports each cell of the set of cells.

Aspect 52: A method for wireless communications at an apparatus of a BS, including: configuring a relay UE for relaying communications with a UE; determining an activated subset of cells in a set of cells associated with the BS based on configuring the relay UE; transmitting, to the UE, control signaling indicating the relay UE and the set of cells; and communicating with the UE via the relay UE and the activated subset of cells based on transmitting the control signaling.

Aspect 53: The method of aspect 52, further including: configuring a set of relay UEs including the relay UE, where the control signaling indicates the set of relay UEs; determining an activated subset of relay UEs in the set of relay UEs based on configuring the set of relay UEs, the activated subset of relay UEs including the relay UE; and communicating with the UE via the activated subset of relay UEs based on determining the activated subset of relay UEs.

Aspect 54: The method of aspect 53, further including: receiving, from the UE, signaling indicating an activation of one or more relay UEs for relaying communications with the BS; and updating the activated subset of relay UEs in the set of relay UEs based on receiving the signaling, where communicating with the UE is further based on updating the activated subset of relay UEs.

Aspect 55: The method of aspect 54, further including: receiving, from the one or more relay UEs, second signaling indicating the activation of the one or more relay UEs for relaying communications with the BS, where updating the activated subset of relay UEs in the set of relay UEs is further based on receiving the second signaling.

Aspect 56: The method of any of aspects 53 through 55, further including: receiving, from the UE, signaling indicating a set of one or more candidate relay UEs configured for relaying communications with the UE, where configuring the set of relay UEs is based on the received signaling.

Aspect 57: The method of aspect 56, where the set of relay UEs include one or more candidate relay UEs of the set of one or more candidate relay UEs.

Aspect 58: The method of any of aspects 56 through 57, further including: receiving, from the UE, a report indicating a respective sidelink channel quality associated with each candidate relay UE of the one or more candidate relay UEs, where configuring the set of relay UEs is further based on receiving the report.

Aspect 59: The method of any of aspects 52 through 58, further including: determining that the BS includes a serving cell of the relay UE, where configuring the relay UE for relaying communications with the UE is further based on determining that the BS includes the serving cell of the relay UE.

Aspect 60: The method of any of aspects 52 through 59, further including: transmitting second control signaling indicating mobility information for the set of cells, the relay UE, or both; and updating the activated subset of cells in the set of cells based on transmitting the second control signaling, where communicating with the UE is further based on updating the activated subset of cells.

Aspect 61: The method of any of aspects 52 through 60, further including: determining a second activated subset of cells associated with communications between the BS and the relay UE based on configuring the relay UE, where determining the activated subset of cells is based on determining the second activated subset of cells.

Aspect 62: The method of aspect 61, further including: determining a second set of cells associated with communications between the BS and the relay UE, where the second set of cells include the second activated subset of cells.

Aspect 63: The method of any of aspects 61 through 62, where the activated subset of cells includes the second activated subset of cells.

Aspect 64: The method of any of aspects 52 through 63, further including: determining that the relay UE supports mobility signaling, where configuring the relay UE is based on determining that the relay UE supports mobility signaling.

Aspect 65: The method of any of aspects 52 through 64, where the set of cells are supported by one or more DUs under a common CU of the BS.

Aspect 66: The method of aspect 65, where the one or more DUs include a common DU that supports each cell of the set of cells.

Aspect 67: An apparatus for wireless communications at an apparatus of a UE, including: a processor; memory coupled with the processor; and instructions stored in the memory and executable by the processor to cause the apparatus to: receive, from a BS, control signaling indicating a relay UE and a set of cells associated with the BS, the relay UE configured for relaying communications with the BS; establish a communications link with the relay UE based on receiving the control signaling; determine an activated subset of cells in the set of cells based on receiving the control signaling and establishing the communications link; and communicate with the BS via the relay UE and the activated subset of cells based on determining the activated subset of cells.

Aspect 68: The apparatus of aspect 67, where the instructions are further executable by the processor to cause the apparatus to: determine a set of relay UEs including the relay UE based on receiving the control signaling; establish communications links with one or more relay UEs of the set of relay UEs based on determining the set of relay UEs; determine an activated subset of relay UEs in the set of relay UEs based on establishing the communications links, the activated subset of relay UEs including the relay UE; and communicate with the BS via the activated subset of relay UEs based on determining the activated subset of relay UEs.

Aspect 69: The apparatus of aspect 68, where the instructions to establish the communications links are executable by the processor to cause the apparatus to: transmit activation signaling to the one or more relay UEs, where the activation signaling indicates an activation of the one or more relay UEs for relaying communications with the BS; and transmit signaling to the BS indicating the activation of the one or more relay UEs for relaying communications with the BS.

Aspect 70: The apparatus of any of aspects 68 through 69, where the instructions are further executable by the processor to cause the apparatus to: transmit, to the BS, signaling indicating a set of candidate relay UEs configured for relaying communications with the BS, where the control signaling is received based on the transmitted signaling.

Aspect 71: The apparatus of aspect 70, where the set of relay UEs include one or more candidate relay UEs of the set of candidate relay UEs.

Aspect 72: The apparatus of any of aspects 70 through 71, where the instructions are further executable by the processor to cause the apparatus to: determine a respective sidelink channel quality associated with each candidate relay UE of the set of candidate relay UEs, where the transmitted signaling is based on determining the respective sidelink channel quality.

Aspect 73: The apparatus of aspect 72, where the instructions are further executable by the processor to cause the apparatus to: transmit, to the BS, a report indicating the respective sidelink channel quality associated with each candidate relay UE of the set of candidate relay UEs, where receiving the control signaling is further based on transmitting the report.

Aspect 74: The apparatus of any of aspects 70 through 73, where the instructions are further executable by the processor to cause the apparatus to: perform a discovery procedure to identify the set of candidate relay UEs, where the transmitted signaling is based on performing the discovery procedure.

Aspect 75: The apparatus of any of aspects 70 through 74, where the instructions are further executable by the processor to cause the apparatus to: determine that the BS includes serving cells for the set of candidate relay UEs, where the transmitted signaling is based on determining that the BS includes the serving cells for the set of candidate relay UEs.

Aspect 76: The apparatus of any of aspects 67 through 75, where the instructions are further executable by the processor to cause the apparatus to: determine that the BS includes a serving cell for the relay UE, where establishing the communications link with the relay UE is further based on determining that the BS includes the serving cell of the relay UE.

Aspect 77: The apparatus of any of aspects 67 through 76, where the instructions are further executable by the processor to cause the apparatus to: receive second control signaling indicating mobility information for the set of cells, the relay UE, or both; and update the activated subset of cells in the set of cells based on receiving the second control signaling, where communicating with the BS is further based on updating the activated subset of cells.

Aspect 78: The apparatus of any of aspects 67 through 77, where the instructions are further executable by the processor to cause the apparatus to: determine a second activated subset of cells associated with communications between the BS and the relay UE based on establishing the communications link, where determining the activated subset of cells is based on determining the second activated subset of cells.

Aspect 79: The apparatus of aspect 78, where the instructions are further executable by the processor to cause the apparatus to: determine a second set of cells associated with communications between the BS and the relay UE, where the second set of cells include the second activated subset of cells.

Aspect 80: The apparatus of any of aspects 78 through 79, where the activated subset of cells includes the second activated subset of cells.

Aspect 81: The apparatus of any of aspects 67 through 80, where the instructions are further executable by the processor to cause the apparatus to: determine that the relay UE supports mobility signaling, where establishing the communications link with the relay UE is further based on determining that the relay UE supports mobility signaling.

Aspect 82: The apparatus of any of aspects 67 through 81, where the communications link with the relay UE includes a sidelink connection.

Aspect 83: The apparatus of any of aspects 67 through 82, where the set of cells are supported by one or more DUs under a common CU of the BS.

Aspect 84: The apparatus of aspect 83, where the one or more DUs include a common DU that supports each cell of the set of cells.

Aspect 85: An apparatus for wireless communications at an apparatus of a BS, including: a processor; memory coupled with the processor; and instructions stored in the memory and executable by the processor to cause the apparatus to: configure a relay UE for relaying communications with a UE; determine an activated subset of cells in a set of cells associated with the BS based on configuring the relay UE; transmit, to the UE, control signaling indicating the relay UE and the set of cells; and communicate with the UE via the relay UE and the activated subset of cells based on transmitting the control signaling.

Aspect 86: The apparatus of aspect 85, where the instructions are further executable by the processor to cause the apparatus to: configure a set of relay UEs including the relay UE, where the control signaling indicates the set of relay UEs; determine an activated subset of relay UEs in the set of relay UEs based on configuring the set of relay UEs, the activated subset of relay UEs including the relay UE; and communicate with the UE via the activated subset of relay UEs based on determining the activated subset of relay UEs.

Aspect 87: The apparatus of aspect 86, where the instructions are further executable by the processor to cause the apparatus to: receive, from the UE, signaling indicating an activation of one or more relay UEs for relaying communications with the BS; and update the activated subset of relay UEs in the set of relay UEs based on receiving the signaling, where communicating with the UE is further based on updating the activated subset of relay UEs.

Aspect 88: The apparatus of aspect 87, where the instructions are further executable by the processor to cause the apparatus to: receive, from the one or more relay UEs, second signaling indicating the activation of the one or more relay UEs for relaying communications with the BS, where updating the activated subset of relay UEs in the set of relay UEs is further based on receiving the second signaling.

Aspect 89: The apparatus of any of aspects 86 through 88, where the instructions are further executable by the processor to cause the apparatus to: receive, from the UE, signaling indicating a set of one or more candidate relay UEs configured for relaying communications with the UE, where configuring the set of relay UEs is based on the received signaling.

Aspect 90: The apparatus of aspect 89, where the set of relay UEs include one or more candidate relay UEs of the set of one or more candidate relay UEs.

Aspect 91: The apparatus of any of aspects 89 through 90, where the instructions are further executable by the processor to cause the apparatus to: receive, from the UE, a report indicating a respective sidelink channel quality associated with each candidate relay UE of the one or more candidate relay UEs, where configuring the set of relay UEs is further based on receiving the report.

Aspect 92: The apparatus of any of aspects 85 through 91, where the instructions are further executable by the processor to cause the apparatus to: determine that the BS includes a serving cell of the relay UE, where configuring the relay UE for relaying communications with the UE is further based on determining that the BS includes the serving cell of the relay UE.

Aspect 93: The apparatus of any of aspects 85 through 92, where the instructions are further executable by the processor to cause the apparatus to: transmit second control signaling indicating mobility information for the set of cells, the relay UE, or both; and update the activated subset of cells in the set of cells based on transmitting the second control signaling, where communicating with the UE is further based on updating the activated subset of cells.

Aspect 94: The apparatus of any of aspects 85 through 93, where the instructions are further executable by the processor to cause the apparatus to: determine a second activated subset of cells associated with communications between the BS and the relay UE based on configuring the relay UE, where determining the activated subset of cells is based on determining the second activated subset of cells.

Aspect 95: The apparatus of aspect 94, where the instructions are further executable by the processor to cause the apparatus to: determine a second set of cells associated with communications between the BS and the relay UE, where the second set of cells include the second activated subset of cells.

Aspect 96: The apparatus of any of aspects 94 through 95, where the activated subset of cells includes the second activated subset of cells.

Aspect 97: The apparatus of any of aspects 85 through 96, where the instructions are further executable by the processor to cause the apparatus to: determine that the relay UE supports mobility signaling, where configuring the relay UE is based on determining that the relay UE supports mobility signaling.

Aspect 98: The apparatus of any of aspects 85 through 97, where the set of cells are supported by one or more DUs under a common CU of the BS.

Aspect 99: The apparatus of aspect 98, where the one or more DUs include a common DU that supports each cell of the set of cells.

Aspect 100: An apparatus for wireless communications at an apparatus of a UE, including: means for receiving, from a BS, control signaling indicating a relay UE and a set of cells associated with the BS, the relay UE configured for relaying communications with the BS; means for establishing a communications link with the relay UE based on receiving the control signaling; means for determining an activated subset of cells in the set of cells based on receiving the control signaling and establishing the communications link; and means for communicating with the BS via the relay UE and the activated subset of cells based on determining the activated subset of cells.

Aspect 101: The apparatus of aspect 100, further including: means for determining a set of relay UEs including the relay UE based on receiving the control signaling; means for establishing communications links with one or more relay UEs of the set of relay UEs based on determining the set of relay UEs; means for determining an activated subset of relay UEs in the set of relay UEs based on establishing the communications links, the activated subset of relay UEs including the relay UE; and means for communicating with the BS via the activated subset of relay UEs based on determining the activated subset of relay UEs.

Aspect 102: The apparatus of aspect 101, where the means for establishing the communications links include: means for transmitting activation signaling to the one or more relay UEs, where the activation signaling indicates an activation of the one or more relay UEs for relaying communications with the BS; and means for transmitting signaling to the BS indicating the activation of the one or more relay UEs for relaying communications with the BS.

Aspect 103: The apparatus of any of aspects 101 through 102, further including: means for transmitting, to the BS, signaling indicating a set of candidate relay UEs configured for relaying communications with the BS, where the control signaling is received based on the transmitted signaling.

Aspect 104: The apparatus of aspect 103, where: the set of relay UEs include one or more candidate relay UEs of the set of candidate relay UEs.

Aspect 105: The apparatus of any of aspects 103 through 104, further including: means for determining a respective sidelink channel quality associated with each candidate relay UE of the set of candidate relay UEs, where the transmitted signaling is based on determining the respective sidelink channel quality.

Aspect 106: The apparatus of aspect 105, further including: means for transmitting, to the BS, a report indicating the respective sidelink channel quality associated with each candidate relay UE of the set of candidate relay UEs, where receiving the control signaling is further based on transmitting the report.

Aspect 107: The apparatus of any of aspects 103 through 106, further including: means for performing a discovery procedure to identify the set of candidate relay UEs, where the transmitted signaling is based on performing the discovery procedure.

Aspect 108: The apparatus of any of aspects 103 through 107, further including: means for determining that the BS includes serving cells for the set of candidate relay UEs, where the transmitted signaling is based on determining that the BS includes the serving cells for the set of candidate relay UEs.

Aspect 109: The apparatus of any of aspects 100 through 108, further including: means for determining that the BS includes a serving cell for the relay UE, where establishing the communications link with the relay UE is further based on determining that the BS includes the serving cell of the relay UE.

Aspect 110: The apparatus of any of aspects 100 through 109, further including: means for receiving second control signaling indicating mobility information for the set of cells, the relay UE, or both; and means for updating the activated subset of cells in the set of cells based on receiving the second control signaling, where communicating with the BS is further based on updating the activated subset of cells.

Aspect 111: The apparatus of any of aspects 100 through 110, further including: means for determining a second activated subset of cells associated with communications between the BS and the relay UE based on establishing the communications link, where determining the activated subset of cells is based on determining the second activated subset of cells.

Aspect 112: The apparatus of aspect 111, further including: means for determining a second set of cells associated with communications between the BS and the relay UE, where the second set of cells include the second activated subset of cells.

Aspect 113: The apparatus of any of aspects 111 through 112, where the activated subset of cells includes the second activated subset of cells.

Aspect 114: The apparatus of any of aspects 100 through 113, further including: means for determining that the relay UE supports mobility signaling, where establishing the communications link with the relay UE is further based on determining that the relay UE supports mobility signaling.

Aspect 115: The apparatus of any of aspects 100 through 114, where the communications link with the relay UE includes a sidelink connection.

Aspect 116: The apparatus of any of aspects 100 through 115, where the set of cells are supported by one or more DUs under a common CU of the BS.

Aspect 117: The apparatus of aspect 116, where: the one or more DUs include a common DU that supports each cell of the set of cells.

Aspect 118: An apparatus for wireless communications at an apparatus of a BS, including: means for configuring a relay UE for relaying communications with a UE; means for determining an activated subset of cells in a set of cells associated with the BS based on configuring the relay UE; means for transmitting, to the UE, control signaling indicating the relay UE and the set of cells; and means for communicating with the UE via the relay UE and the activated subset of cells based on transmitting the control signaling.

Aspect 119: The apparatus of aspect 118, further including: means for configuring a set of relay UEs including the relay UE, where the control signaling indicates the set of relay UEs; means for determining an activated subset of relay UEs in the set of relay UEs based on configuring the set of relay UEs, the activated subset of relay UEs including the relay UE; and means for communicating with the UE via the activated subset of relay UEs based on determining the activated subset of relay UEs.

Aspect 120: The apparatus of aspect 119, further including: means for receiving, from the UE, signaling indicating an activation of one or more relay UEs for relaying communications with the BS; and means for updating the activated subset of relay UEs in the set of relay UEs based on receiving the signaling, where communicating with the UE is further based on updating the activated subset of relay UEs.

Aspect 121: The apparatus of aspect 120, further including: means for receiving, from the one or more relay UEs, second signaling indicating the activation of the one or more relay UEs for relaying communications with the BS, where updating the activated subset of relay UEs in the set of relay UEs is further based on receiving the second signaling.

Aspect 122: The apparatus of any of aspects 119 through 121, further including: means for receiving, from the UE, signaling indicating a set of one or more candidate relay UEs configured for relaying communications with the UE, where configuring the set of relay UEs is based on the received signaling.

Aspect 123: The apparatus of aspect 122, where: the set of relay UEs include one or more candidate relay UEs of the set of one or more candidate relay UEs.

Aspect 124: The apparatus of any of aspects 122 through 123, further including: means for receiving, from the UE, a report indicating a respective sidelink channel quality associated with each candidate relay UE of the one or more candidate relay UEs, where configuring the set of relay UEs is further based on receiving the report.

Aspect 125: The apparatus of any of aspects 118 through 124, further including: means for determining that the BS includes a serving cell of the relay UE, where configuring the relay UE for relaying communications with the UE is further based on determining that the BS includes the serving cell of the relay UE.

Aspect 126: The apparatus of any of aspects 118 through 125, further including: means for transmitting second control signaling indicating mobility information for the set of cells, the relay UE, or both; and means for updating the activated subset of cells in the set of cells based on transmitting the second control signaling, where communicating with the UE is further based on updating the activated subset of cells.

Aspect 127: The apparatus of any of aspects 118 through 126, further including: means for determining a second activated subset of cells associated with communications between the BS and the relay UE based on configuring the relay UE, where determining the activated subset of cells is based on determining the second activated subset of cells.

Aspect 128: The apparatus of aspect 127, further including: means for determining a second set of cells associated with communications between the BS and the relay UE, where the second set of cells include the second activated subset of cells.

Aspect 129: The apparatus of any of aspects 127 through 128, where the activated subset of cells includes the second activated subset of cells.

Aspect 130: The apparatus of any of aspects 118 through 129, further including: means for determining that the relay UE supports mobility signaling, where configuring the relay UE is based on determining that the relay UE supports mobility signaling.

Aspect 131: The apparatus of any of aspects 118 through 130, where the set of cells are supported by one or more DUs under a common CU of the BS.

Aspect 132: The apparatus of aspect 131, where: the one or more DUs include a common DU that supports each cell of the set of cells.

Aspect 133: A non-transitory computer-readable medium storing code for wireless communications at an apparatus of a UE, the code including instructions executable by a processor to: receive, from a BS, control signaling indicating a relay UE and a set of cells associated with the BS, the relay UE configured for relaying communications with the BS; establish a communications link with the relay UE based on receiving the control signaling; determine an activated subset of cells in the set of cells based on receiving the control signaling and establishing the communications link; and communicate with the BS via the relay UE and the activated subset of cells based on determining the activated subset of cells.

Aspect 134: The non-transitory computer-readable medium of aspect 133, where the instructions are further executable by the processor to: determine a set of relay UEs including the relay UE based on receiving the control signaling; establish communications links with one or more relay UEs of the set of relay UEs based on determining the set of relay UEs; determine an activated subset of relay UEs in the set of relay UEs based on establishing the communications links, the activated subset of relay UEs including the relay UE; and communicate with the BS via the activated subset of relay UEs based on determining the activated subset of relay UEs.

Aspect 135: The non-transitory computer-readable medium of aspect 134, where the instructions to establish the communications links are executable by the processor to: transmit activation signaling to the one or more relay UEs, where the activation signaling indicates an activation of the one or more relay UEs for relaying communications with the BS; and transmit signaling to the BS indicating the activation of the one or more relay UEs for relaying communications with the BS.

Aspect 136: The non-transitory computer-readable medium of any of aspects 134 through 135, where the instructions are further executable by the processor to: transmit, to the BS, signaling indicating a set of candidate relay UEs configured for relaying communications with the BS, where the control signaling is received based on the transmitted signaling.

Aspect 137: The non-transitory computer-readable medium of aspect 136, where the set of relay UEs include one or more candidate relay UEs of the set of candidate relay UEs.

Aspect 138: The non-transitory computer-readable medium of any of aspects 136 through 137, where the instructions are further executable by the processor to: determine a respective sidelink channel quality associated with each candidate relay UE of the set of candidate relay UEs, where the transmitted signaling is based on determining the respective sidelink channel quality.

Aspect 139: The non-transitory computer-readable medium of aspect 138, where the instructions are further executable by the processor to: transmit, to the BS, a report indicating the respective sidelink channel quality associated with each candidate relay UE of the set of candidate relay UEs, where receiving the control signaling is further based on transmitting the report.

Aspect 140: The non-transitory computer-readable medium of any of aspects 136 through 139, where the instructions are further executable by the processor to: perform a discovery procedure to identify the set of candidate relay UEs, where the transmitted signaling is based on performing the discovery procedure.

Aspect 141: The non-transitory computer-readable medium of any of aspects 136 through 140, where the instructions are further executable by the processor to: determine that the BS includes serving cells for the set of candidate relay UEs, where the transmitted signaling is based on determining that the BS includes the serving cells for the set of candidate relay UEs.

Aspect 142: The non-transitory computer-readable medium of any of aspects 133 through 141, where the instructions are further executable by the processor to: determine that the BS includes a serving cell for the relay UE, where establishing the communications link with the relay UE is further based on determining that the BS includes the serving cell of the relay UE.

Aspect 143: The non-transitory computer-readable medium of any of aspects 133 through 142, where the instructions are further executable by the processor to: receive second control signaling indicating mobility information for the set of cells, the relay UE, or both; and update the activated subset of cells in the set of cells based on receiving the second control signaling, where communicating with the BS is further based on updating the activated subset of cells.

Aspect 144: The non-transitory computer-readable medium of any of aspects 133 through 143, where the instructions are further executable by the processor to: determine a second activated subset of cells associated with communications between the BS and the relay UE based on establishing the communications link, where determining the activated subset of cells is based on determining the second activated subset of cells.

Aspect 145: The non-transitory computer-readable medium of aspect 144, where the instructions are further executable by the processor to: determine a second set of cells associated with communications between the BS and the relay UE, where the second set of cells include the second activated subset of cells.

Aspect 146: The non-transitory computer-readable medium of any of aspects 144 through 145, where the activated subset of cells includes the second activated subset of cells.

Aspect 147: The non-transitory computer-readable medium of any of aspects 133 through 146, where the instructions are further executable by the processor to: determine that the relay UE supports mobility signaling, where establishing the communications link with the relay UE is further based on determining that the relay UE supports mobility signaling.

Aspect 148: The non-transitory computer-readable medium of any of aspects 133 through 147, where the communications link with the relay UE includes a sidelink connection.

Aspect 149: The non-transitory computer-readable medium of any of aspects 133 through 148, where the set of cells are supported by one or more DUs under a common CU of the BS.

Aspect 150: The non-transitory computer-readable medium of aspect 149, where the one or more DUs include a common DU that supports each cell of the set of cells.

Aspect 151: A non-transitory computer-readable medium storing code for wireless communications at an apparatus of a BS, the code including instructions executable by a processor to: configure a relay UE for relaying communications with a UE; determine an activated subset of cells in a set of cells associated with the BS based on configuring the relay UE; transmit, to the UE, control signaling indicating the relay UE and the set of cells; and communicate with the UE via the relay UE and the activated subset of cells based on transmitting the control signaling.

Aspect 152: The non-transitory computer-readable medium of aspect 151, where the instructions are further executable by the processor to: configure a set of relay UEs including the relay UE, where the control signaling indicates the set of relay UEs; determine an activated subset of relay UEs in the set of relay UEs based on configuring the set of relay UEs, the activated subset of relay UEs including the relay UE; and communicate with the UE via the activated subset of relay UEs based on determining the activated subset of relay UEs.

Aspect 153: The non-transitory computer-readable medium of aspect 152, where the instructions are further executable by the processor to: receive, from the UE, signaling indicating an activation of one or more relay UEs for relaying communications with the BS; and update the activated subset of relay UEs in the set of relay UEs based on receiving the signaling, where communicating with the UE is further based on updating the activated subset of relay UEs.

Aspect 154: The non-transitory computer-readable medium of aspect 153, where the instructions are further executable by the processor to: receive, from the one or more relay UEs, second signaling indicating the activation of the one or more relay UEs for relaying communications with the BS, where updating the activated subset of relay UEs in the set of relay UEs is further based on receiving the second signaling.

Aspect 155: The non-transitory computer-readable medium of any of aspects 152 through 154, where the instructions are further executable by the processor to: receive, from the UE, signaling indicating a set of one or more candidate relay UEs configured for relaying communications with the UE, where configuring the set of relay UEs is based on the received signaling.

Aspect 156: The non-transitory computer-readable medium of aspect 155, where the set of relay UEs include one or more candidate relay UEs of the set of one or more candidate relay UEs.

Aspect 157: The non-transitory computer-readable medium of any of aspects 155 through 156, where the instructions are further executable by the processor to: receive, from the UE, a report indicating a respective sidelink channel quality associated with each candidate relay UE of the one or more candidate relay UEs, where configuring the set of relay UEs is further based on receiving the report.

Aspect 158: The non-transitory computer-readable medium of any of aspects 151 through 157, where the instructions are further executable by the processor to: determine that the BS includes a serving cell of the relay UE, where configuring the relay UE for relaying communications with the UE is further based on determining that the BS includes the serving cell of the relay UE.

Aspect 159: The non-transitory computer-readable medium of any of aspects 151 through 158, where the instructions are further executable by the processor to: transmit second control signaling indicating mobility information for the set of cells, the relay UE, or both; and update the activated subset of cells in the set of cells based on transmitting the second control signaling, where communicating with the UE is further based on updating the activated subset of cells.

Aspect 160: The non-transitory computer-readable medium of any of aspects 151 through 159, where the instructions are further executable by the processor to: determine a second activated subset of cells associated with communications between the BS and the relay UE based on configuring the relay UE, where determining the activated subset of cells is based on determining the second activated subset of cells.

Aspect 161: The non-transitory computer-readable medium of aspect 160, where the instructions are further executable by the processor to: determine a second set of cells associated with communications between the BS and the relay UE, where the second set of cells include the second activated subset of cells.

Aspect 162: The non-transitory computer-readable medium of any of aspects 160 through 161, where the activated subset of cells includes the second activated subset of cells.

Aspect 163: The non-transitory computer-readable medium of any of aspects 151 through 162, where the instructions are further executable by the processor to: determine that the relay UE supports mobility signaling, where configuring the relay UE is based on determining that the relay UE supports mobility signaling.

Aspect 164: The non-transitory computer-readable medium of any of aspects 151 through 163, where the set of cells are supported by one or more DUs under a common CU of the BS.

Aspect 165: The non-transitory computer-readable medium of aspect 164, where the one or more DUs include a common DU that supports each cell of the set of cells.

Aspect 166: An apparatus for wireless communications at an apparatus of a UE, including: a controller associated with a memory device, where the controller is configured to cause the apparatus to: receive, from a BS, control signaling indicating a relay UE and a set of cells associated with the BS, the relay UE configured for relaying communications with the BS; establish a communications link with the relay UE based on receiving the control signaling; determine an activated subset of cells in the set of cells based on receiving the control signaling and establishing the communications link; and communicate with the BS via the relay UE and the activated subset of cells based on determining the activated subset of cells.

Aspect 167: The apparatus of aspect 166, where the controller is further configured to cause the apparatus to: determine a set of relay UEs including the relay UE based on receiving the control signaling; establish communications links with one or more relay UEs of the set of relay UEs based on determining the set of relay UEs; determine an activated subset of relay UEs in the set of relay UEs based on establishing the communications links, the activated subset of relay UEs including the relay UE; and communicate with the BS via the activated subset of relay UEs based on determining the activated subset of relay UEs.

Aspect 168: The apparatus of aspect 167, where establishing the communications links is configured to cause the apparatus to: transmit activation signaling to the one or more relay UEs, where the activation signaling indicates an activation of the one or more relay UEs for relaying communications with the BS; and transmit signaling to the BS indicating the activation of the one or more relay UEs for relaying communications with the BS.

Aspect 169: The apparatus of any of aspects 167 through 168, where the controller is further configured to cause the apparatus to: transmit, to the BS, signaling indicating a set of candidate relay UEs configured for relaying communications with the BS, where the control signaling is received based on the transmitted signaling.

Aspect 170: The apparatus of aspect 169, where the set of relay UEs include one or more candidate relay UEs of the set of candidate relay UEs.

Aspect 171: The apparatus of any of aspects 169 through 170, where the controller is further configured to cause the apparatus to: determine a respective sidelink channel quality associated with each candidate relay UE of the set of candidate relay UEs, where the transmitted signaling is based on determining the respective sidelink channel quality.

Aspect 172: The apparatus of aspect 171, where the controller is further configured to cause the apparatus to: transmit, to the BS, a report indicating the respective sidelink channel quality associated with each candidate relay UE of the set of candidate relay UEs, where receiving the control signaling is further based on transmitting the report.

Aspect 173: The apparatus of any of aspects 169 through 172, where the controller is further configured to cause the apparatus to: perform a discovery procedure to identify the set of candidate relay UEs, where the transmitted signaling is based on performing the discovery procedure.

Aspect 174: The apparatus of any of aspects 169 through 173, where the controller is further configured to cause the apparatus to: determine that the BS includes serving cells for the set of candidate relay UEs, where the transmitted signaling is based on determining that the BS includes the serving cells for the set of candidate relay UEs.

Aspect 175: The apparatus of any of aspects 166 through 174, where the controller is further configured to cause the apparatus to: determine that the BS includes a serving cell for the relay UE, where establishing the communications link with the relay UE is further based on determining that the BS includes the serving cell of the relay UE.

Aspect 176: The apparatus of any of aspects 166 through 175, where the controller is further configured to cause the apparatus to: receive second control signaling indicating mobility information for the set of cells, the relay UE, or both; and update the activated subset of cells in the set of cells based on receiving the second control signaling, where communicating with the BS is further based on updating the activated subset of cells.

Aspect 177: The apparatus of any of aspects 166 through 176, where the controller is further configured to cause the apparatus to: determine a second activated subset of cells associated with communications between the BS and the relay UE based on establishing the communications link, where determining the activated subset of cells is based on determining the second activated subset of cells.

Aspect 178: The apparatus of aspect 177, where the controller is further configured to cause the apparatus to: determine a second set of cells associated with communications between the BS and the relay UE, where the second set of cells include the second activated subset of cells.

Aspect 179: The apparatus of any of aspects 177 through 178, where the activated subset of cells includes the second activated subset of cells.

Aspect 180: The apparatus of any of aspects 166 through 179, where the controller is further configured to cause the apparatus to: determine that the relay UE supports mobility signaling, where establishing the communications link with the relay UE is further based on determining that the relay UE supports mobility signaling.

Aspect 181: The apparatus of any of aspects 166 through 180, where the communications link with the relay UE includes a sidelink connection.

Aspect 182: The apparatus of any of aspects 166 through 181, where the set of cells are supported by one or more DUs under a common CU of the BS.

Aspect 183: The apparatus of aspect 182, where the one or more DUs include a common DU that supports each cell of the set of cells.

Aspect 184: An apparatus for wireless communications at an apparatus of a BS, including: a controller associated with a memory device, where the controller is configured to cause the apparatus to: configure a relay UE for relaying communications with a UE; determine an activated subset of cells in a set of cells associated with the BS based on configuring the relay UE; transmit, to the UE, control signaling indicating the relay UE and the set of cells; and communicate with the UE via the relay UE and the activated subset of cells based on transmitting the control signaling.

Aspect 185: The apparatus of aspect 184, where the controller is further configured to cause the apparatus to: configure a set of relay UEs including the relay UE, where the control signaling indicates the set of relay UEs; determine an activated subset of relay UEs in the set of relay UEs based on configuring the set of relay UEs, the activated subset of relay UEs including the relay UE; and communicate with the UE via the activated subset of relay UEs based on determining the activated subset of relay UEs.

Aspect 186: The apparatus of aspect 185, where the controller is further configured to cause the apparatus to: receive, from the UE, signaling indicating an activation of one or more relay UEs for relaying communications with the BS; and update the activated subset of relay UEs in the set of relay UEs based on receiving the signaling, where communicating with the UE is further based on updating the activated subset of relay UEs.

Aspect 187: The apparatus of aspect 186, where the controller is further configured to cause the apparatus to: receive, from the one or more relay UEs, second signaling indicating the activation of the one or more relay UEs for relaying communications with the BS, where updating the activated subset of relay UEs in the set of relay UEs is further based on receiving the second signaling.

Aspect 188: The apparatus of any of aspects 185 through 187, where the controller is further configured to cause the apparatus to: receive, from the UE, signaling indicating a set of one or more candidate relay UEs configured for relaying communications with the UE, where configuring the set of relay UEs is based on the received signaling.

Aspect 189: The apparatus of aspect 188, where the set of relay UEs include one or more candidate relay UEs of the set of one or more candidate relay UEs.

Aspect 190: The apparatus of any of aspects 188 through 189, where the controller is further configured to cause the apparatus to: receive, from the UE, a report indicating a respective sidelink channel quality associated with each candidate relay UE of the one or more candidate relay UEs, where configuring the set of relay UEs is further based on receiving the report.

Aspect 191: The apparatus of any of aspects 184 through 190, where the controller is further configured to cause the apparatus to: determine that the BS includes a serving cell of the relay UE, where configuring the relay UE for relaying communications with the UE is further based on determining that the BS includes the serving cell of the relay UE.

Aspect 192: The apparatus of any of aspects 184 through 191, where the controller is further configured to cause the apparatus to: transmit second control signaling indicating mobility information for the set of cells, the relay UE, or both; and update the activated subset of cells in the set of cells based on transmitting the second control signaling, where communicating with the UE is further based on updating the activated subset of cells.

Aspect 193: The apparatus of any of aspects 184 through 192, where the controller is further configured to cause the apparatus to: determine a second activated subset of cells associated with communications between the BS and the relay UE based on configuring the relay UE, where determining the activated subset of cells is based on determining the second activated subset of cells.

Aspect 194: The apparatus of aspect 193, where the controller is further configured to cause the apparatus to: determine a second set of cells associated with communications between the BS and the relay UE, where the second set of cells include the second activated subset of cells.

Aspect 195: The apparatus of any of aspects 193 through 194, where the activated subset of cells includes the second activated subset of cells.

Aspect 196: The apparatus of any of aspects 184 through 195, where the controller is further configured to cause the apparatus to: determine that the relay UE supports mobility signaling, where configuring the relay UE is based on determining that the relay UE supports mobility signaling.

Aspect 197: The apparatus of any of aspects 184 through 196, where the set of cells are supported by one or more DUs under a common CU of the BS.

Aspect 198: The apparatus of aspect 197, where the one or more DUs include a common DU that supports each cell of the set of cells.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a DSP, an ASIC, an FPGA or other programmable logic device, discrete gate or transistor logic, discrete hardware components, or any combination thereof designed to perform the functions described herein. A general-purpose processor may be a microprocessor, or any conventional processor, controller, microcontroller, or state machine. A processor also may be implemented as a combination of computing devices, such as a combination of a DSP and a microprocessor, a set of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, such as one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, electrically erasable programmable ROM (EEPROM), compact disc (CD)-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes CD, laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can, in some implementations, be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some implementations, the actions recited in the claims can be performed in a different order and still achieve desirable results.

What is claimed is:

1. An apparatus for wireless communications at a user equipment (UE), comprising:
a first interface configured to:
obtain, from a network device, control signaling indicating a set of relay UEs and a set of cells associated with the network device, wherein the set of cells is for connecting the UE to the network device using the set of relay UEs and the set of relay UEs are configured for relaying communications with the network device;
a processing system configured to:
determine the set of relay UEs based at least in part on the control signaling;
establish communications links with one or more relay UEs of the set of relay UEs based at least in part on the set of relay UEs;
determine an activated subset of relay UEs in the set of relay UEs based at least in part on the communications links; and
determine an activated subset of cells in the set of cells associated with the control signaling and the communications links; and
the first interface or a second interface is configured to:
communicate with the network device via a relay UE of the activated subset of relay UEs and the activated subset of cells.

2. The apparatus of claim 1, wherein:
the first interface or the second interface is further configured to:
output activation signaling for transmission to the one or more relay UEs, wherein the activation signaling indicates an activation of the one or more relay UEs for relaying communications with the network device; and
output signaling for transmission to the network device indicating the activation of the one or more relay UEs for relaying communications with the network device.

3. The apparatus of claim 1, wherein:
the first interface or the second interface is further configured to:
output, for transmission to the network device, signaling indicating a set of candidate relay UEs configured for relaying communications with the network device, wherein the control signaling is based at least in part on the signaling.

4. The apparatus of claim 3, wherein:
the processing system is further configured to:
determine a respective sidelink channel quality associated with each candidate relay UE of the set of candidate relay UEs, wherein the signaling is based at least in part on the respective sidelink channel quality; and
the first interface or the second interface is further configured to:
output, for transmission to the network device, a report indicating the respective sidelink channel quality associated with each candidate relay UE of the set of candidate relay UEs, wherein the control signaling is further based at least in part on the report.

5. The apparatus of claim 3, wherein:
the processing system is further configured to:
determine that the network device comprises serving cells for the set of candidate relay UEs, wherein the signaling is based at least in part on the network device comprising the serving cells for the set of candidate relay UEs.

6. The apparatus of claim 1, wherein:
the processing system is further configured to:
determine that the network device comprises a serving cell for the relay UE, wherein establishing the communications links with the one or more relay UEs is further based at least in part on the network device comprising the serving cell of the relay UE.

7. The apparatus of claim 1, wherein:
the first interface or the second interface is further configured to:
obtain second control signaling indicating mobility information for the set of cells, the set of relay UEs, or both; and
the processing system is further configured to:
update the activated subset of cells in the set of cells based at least in part on the second control signaling, wherein communicating with the network device is further based at least in part on the updated activated subset of cells.

8. The apparatus of claim 1, wherein:
the processing system is further configured to:
determine a second activated subset of cells associated with communications between the network device and the relay UE based at least in part on the communications links, wherein determining the activated subset of cells is based at least in part on the second activated subset of cells.

9. The apparatus of claim 1, wherein:
the processing system is further configured to:
  determine that the relay UE supports mobility signaling, wherein establishing the communications links with the one or more relay UEs is further based at least in part on the relay UE supporting the mobility signaling.

10. The apparatus of claim 1, wherein:
the set of cells are supported by one or more distributed units (DUs) under a common central unit (CU) of the network device.

11. An apparatus for wireless communications at a network device, comprising:
a processing system configured to:
  configure a set of relay user equipment (UEs) for relaying communications with a UE;
  determine an activated subset of relay UEs in the set of relay UEs based at least in part on the set of relay UEs; and
  determine an activated subset of cells in a set of cells associated with the network device and the configuration of the set of relay UEs;
a first interface configured to:
  output, for transmission to the UE, control signaling indicating the set of relay UEs and the set of cells, wherein the set of cells is for connecting the UE to the network device using the set of relay UEs; and
the first interface or a second interface configured to:
  communicate with the UE via a relay UE of the activated subset of relay UEs and the activated subset of cells.

12. The apparatus of claim 11, wherein:
the first interface or the second interface is further configured to:
  obtain, from the UE, signaling indicating an activation of one or more relay UEs of the set of UEs for relaying communications with the network device; and
the processing system is further configured to:
  update the activated subset of relay UEs in the set of relay UEs based at least in part on the signaling, wherein communicating with the UE is further based at least in part on the updated activated subset of relay UEs.

13. The apparatus of claim 12, wherein:
the first interface or the second interface is further configured to:
  obtain, from the one or more relay UEs, second signaling indicating the activation of the one or more relay UEs for relaying communications with the network device, wherein updating the activated subset of relay UEs in the set of relay UEs is further based at least in part on the second signaling.

14. The apparatus of claim 11, wherein:
the first interface or the second interface is further configured to:
  obtain, from the UE, signaling indicating a set of one or more candidate relay UEs configured for relaying communications with the UE, wherein configuring the set of relay UEs is based at least in part on the signaling.

15. The apparatus of claim 14, wherein:
the first interface or the second interface is further configured to:
  obtain, from the UE, a report indicating a respective sidelink channel quality associated with each candidate relay UE of the set of one or more candidate relay UEs, wherein configuring the set of relay UEs is further based at least in part on the report.

16. The apparatus of claim 11, wherein:
the processing system is further configured to:
  determine that the network device comprises a serving cell of the relay UE, wherein configuring the set of relay UEs for relaying communications with the UE is further based at least in part on the network device comprising the serving cell of the relay UE.

17. The apparatus of claim 11, wherein:
the first interface or the second interface is further configured to:
  obtain second control signaling indicating mobility information for the set of cells, the set of relay UEs, or both; and
the processing system is further configured to:
  update the activated subset of cells in the set of cells based at least in part on the second control signaling, wherein communicating with the UE is further based at least in part on the updated activated subset of cells.

18. The apparatus of claim 11, wherein:
the processing system is further configured to:
  determine a second activated subset of cells associated with communications between the network device and the relay UE based at least in part on the relay UE, wherein determining the activated subset of cells is based at least in part on the second activated subset of cells.

19. The apparatus of claim 11, wherein:
the processing system is further configured to:
  determine that the relay UE supports mobility signaling, wherein configuring the set of relay UEs is based at least in part on the relay UE supporting the mobility signaling.

20. The apparatus of claim 11, wherein:
the set of cells are supported by one or more distributed units (DUs) under a common central unit (CU) of the network device.

21. A method for wireless communications at a user equipment (UE), comprising:
  receiving, from a network device, control signaling indicating a set of relay UEs and a set of cells associated with the network device, wherein the set of cells is for connecting the UE to the network device using the set of relay UEs and the set of relay UEs are configured for relaying communications with the network device;
  determining the set of relay UEs based at least in part on the control signaling;
  establishing communications links with one or more relay UEs of the set of relay UEs based at least in part on the set of relay UEs;
  determining an activated subset of relay UEs in the set of relay UEs based at least in part on establishing the communications links;
  determining an activated subset of cells in the set of cells associated with the control signaling and the communications links; and
  communicating with the network device via a relay UE of the activated subset of relay UEs and the activated subset of cells.

22. The method of claim 21, further comprising:

determining that the network device comprises serving cells for a set of candidate relay UEs for relaying communications with the network device, wherein signaling indicating the set of candidate relay UEs is transmitted based at least in part on the network device comprising the serving cells for the set of candidate relay UEs.

23. The method of claim 21, further comprising:

determining that the network device comprises a serving cell for the relay UE, wherein establishing the communications links with the one or more relay UEs is further based at least in part on the network device comprising the serving cell of the relay UE.

24. The method of claim 21, further comprising:

receiving second control signaling indicating mobility information for the set of cells, the set of relay UEs, or both; and updating the activated subset of cells in the set of cells based at least in part on receiving the second control signaling, wherein communicating with the network device is further based at least in part on the updated activated subset of cells.

25. The method of claim 21, further comprising:

determining that the relay UE supports mobility signaling, wherein establishing the communications links with the one or more relay UEs is further based at least in part on the relay UE supporting the mobility signaling.

26. A method for wireless communications at a network device, comprising:

configuring a set of relay user equipment (UEs) for relaying communications with a UE;

determining an activated subset of relay UEs in the set of relay UEs based at least in part on the set of relay UEs;

determining an activated subset of cells in a set of cells associated with the network device and the configuration of the set of relay UEs;

transmitting, to the UE, control signaling indicating the set of relay UEs and the set of cells, wherein the set of cells is for connecting the UE to the network device using the set of relay UEs; and communicating with the UE via a relay UE of the activated subset of relay UEs and the activated subset of cells.

27. The method of claim 26, further comprising:

determining that the network device comprises a serving cell of the relay UE, wherein configuring the set of relay UEs for relaying communications with the UE is further based at least in part on the network device comprising the serving cell of the relay UE.

28. The method of claim 26, further comprising:

transmitting second control signaling indicating mobility information for the set of cells, the set of relay UEs, or both; and updating the activated subset of cells in the set of cells based at least in part on the second control signaling, wherein communicating with the UE is further based at least in part on the updated activated subset of cells.

* * * * *